United States Patent
Tarusawa et al.

(10) Patent No.: US 8,820,694 B2
(45) Date of Patent: Sep. 2, 2014

(54) SEAT SLIDE STRUCTURE FOR VEHICLE

(75) Inventors: Makoto Tarusawa, Fuchu-cho (JP); Kiyonori Umezaki, Fuchu-cho (JP)

(73) Assignee: Delta Kogyo Co., Ltd. (JP)

( * ) Notice: Subject to any disclaimer, the term of this patent is extended or adjusted under 35 U.S.C. 154(b) by 425 days.

(21) Appl. No.: 12/889,514

(22) Filed: Sep. 24, 2010

(65) Prior Publication Data

US 2011/0079699 A1 Apr. 7, 2011

(30) Foreign Application Priority Data

| Oct. 5, 2009 | (JP) | 2009-231199 |
| Oct. 5, 2009 | (JP) | 2009-231200 |
| Oct. 5, 2009 | (JP) | 2009-231299 |
| Oct. 5, 2009 | (JP) | 2009-231300 |

(51) Int. Cl.
*F16M 13/00* (2006.01)
*B60N 2/06* (2006.01)

(52) U.S. Cl.
CPC ..................... *B60N 2/067* (2013.01)
USPC ............. 248/430; 296/65.12; 296/65.13; 296/65.15; 248/429

(58) Field of Classification Search
CPC ........ B60N 2/067; B60N 2/07; B60N 2/0715; B60N 2/0705; B60N 2/0825
USPC ......... 248/424, 429; 296/65.01, 65.11, 65.13, 296/65.15; 297/311, 331, 344.1; 384/34, 384/47; 74/89.14, 89.23
See application file for complete search history.

(56) References Cited

U.S. PATENT DOCUMENTS

| 2003/0052246 A1* | 3/2003 | Hoshihara et al. ............ 248/430 |
| 2004/0206195 A1* | 10/2004 | Landskron et al. .......... 74/89.14 |
| 2004/0206878 A1* | 10/2004 | Borbe et al. .................. 248/424 |
| 2006/0060015 A1* | 3/2006 | Hofschulte et al. ......... 74/89.23 |
| 2006/0249644 A1* | 11/2006 | Folliot et al. ................. 248/429 |
| 2009/0000424 A1 | 1/2009 | Taubmann et al. |
| 2009/0243326 A1 | 10/2009 | Kimata et al. |

FOREIGN PATENT DOCUMENTS

| FR | 2 882 975 | 9/2006 |
| FR | 2 926 263 | 7/2009 |
| JP | 2003-56674 | 2/2003 |
| JP | 2004-106713 | 4/2004 |
| JP | 2005-153546 | 6/2005 |
| JP | 2006-335153 | 12/2006 |

* cited by examiner

*Primary Examiner* — Todd M Epps
(74) *Attorney, Agent, or Firm* — Gerald E. Hespos; Michael J. Porco; Matthew T. Hespos

(57) ABSTRACT

A lower rail or an upper rail has a first wall provided at a position on a first one of opposite sides in a widthwise direction thereof, and a second wall provided at a position on the other, second, side in the widthwise direction and disposed opposed to the first wall. At least one of the first wall and the second wall has an opening. At least one of an outer portion of the holding member in the widthwise direction and an outer portion of the nut member in the widthwise direction is inserted in the opening and disposed opposed to an inner side-surface of the opening facing in a frontward-rearward direction.

10 Claims, 20 Drawing Sheets

US 8,820,694 B2

SEAT SLIDE STRUCTURE FOR VEHICLE

BACKGROUND OF THE INVENTION

1. Field of the Invention

The present invention relates to a seat slide structure for a vehicle, such as an automobile.

2. Description of the Related Art

Heretofore, there has been proposed a seat slide structure for a vehicle, as disclosed, for example, in JP 2004-106713A. A seat slide structure disclosed in this publication comprises a screw rod (threaded rod) non-rotatably fixed to a lower rail, and a nut member screwed with the screw rod. A holding member is fixed to the upper rail. The holding member is formed by subjecting a plate-shaped body to bending. The holding member includes a front holding piece, a rear holding piece, and a connection piece connecting between respective base ends of the front and rear holding pieces, and has a U shape.

The nut member is rotatably supported by a gearbox. The gearbox is installed between the front and rear holding pieces of the holding member. In other words, the nut member is held by the holding member through the gearbox (see FIG. 4 in the JP 2004-106713A).

When the nut member is rotated and moved along an axial direction of the screw rod, the nut member presses the holding member frontwardly or rearwardly through the gearbox. Thus, the upper rail is moved frontwardly or rearwardly with respect to the lower rail.

However, the holding member having a U shape involves the following problem. For example, as shown in FIG. 28, when a frontward or rearward force P is applied to an upper rail 100 (FIG. 28 illustrates an example where a rearward force is applied thereto), a holding member 101 is urged to be moved in the direction of the force P together with the upper rail 100, so that it presses a gearbox 102. The gearbox 102 receiving the force P presses a nut member 103. However, the pressed nut member 103 cannot be moved because it is screwed with a screw rod 104. Thus, the gearbox 102 and the holding member 101 receive a reaction force from the nut member 103. The reaction force is likely to cause deformation of the holding member 101, as shown in FIG. 28.

As means for suppressing such deformation, for example, it is contemplated to increase a plate thickness of each of the gearbox 102 and the holding member 101. However, in this case, due to an increase in force required for bending, it becomes difficult to adequately form the gearbox 102 and the holding member 101. Moreover, due to an increase in size of the holding member, it becomes difficult to install the holding member in the upper or lower rail.

SUMMARY OF THE INVENTION

It is an object of the present invention to provide a vehicle seat slide structure capable of suppressing deformation of a holding member, while downsizing the holding member.

A vehicle seat slide structure of the present invention comprises a lower rail fixed to a vehicle body to extend a frontward-rearward direction of the vehicle body, an upper rail fixed to a seat and adapted to be relatively movable with respect to the lower rail in the frontward-rearward direction, a screw rod provided in one of the lower rail and the upper rail, a nut member screwed with the screw rod in a relatively rotatable manner with respect to the screw rod, and a holding member provided in a remaining one of the lower rail and the upper rail to hold the nut member.

The remaining one of the lower rail and the upper rail has a first wall provided at a position on a first one of opposite sides in a widthwise direction thereof, and a second wall provided at a position on the other, second, side in the widthwise direction and disposed opposed to the first wall. At least one of the first wall and the second wall has an opening. At least one of a part of the holding member and a part of the nut member is inserted in the opening and disposed opposed to an inner side-surface of the opening facing in the frontward-rearward direction.

DETAILED DESCRIPTION OF THE PREFERRED EMBODIMENTS

Figure 1:
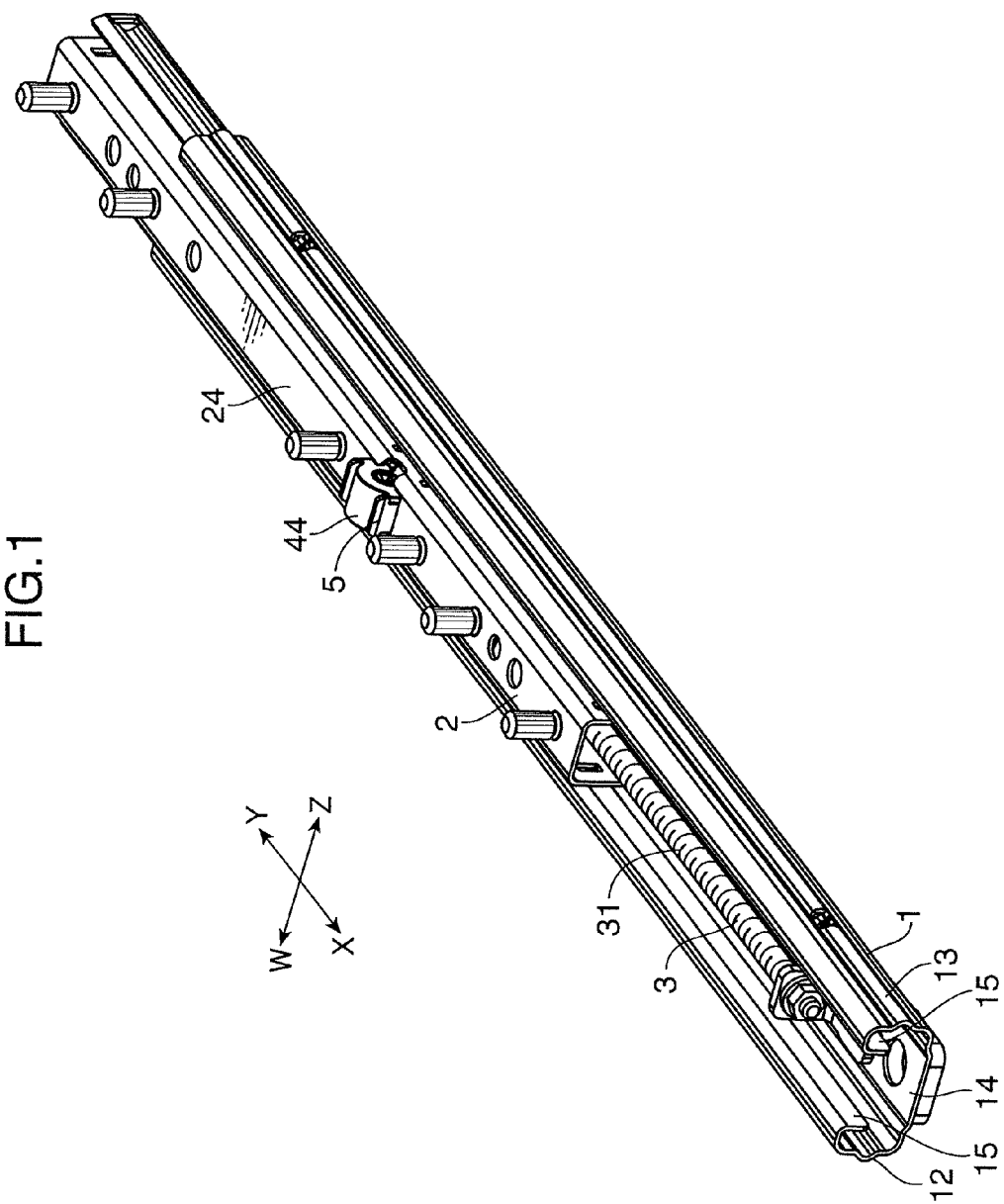
FIG. 1 is a perspective view showing an automobile seat slide structure according to a first embodiment of the present invention.

With reference to the drawings, a vehicle seat slide structure according to an embodiment of the present invention will now be specifically described. The following embodiments will be described based on an example where a vehicle is an automobile. In each figure, the X direction, the Y direction, the Z direction and the W direction indicate a frontward direction of a vehicle body, a rearward direction of the vehicle body, a leftward direction of the vehicle body and a rightward direction of the vehicle body, respectively.

<First Embodiment>

As shown in FIGS. 1 to 6, an automobile seat slide structure according to the first embodiment comprises an elongate-shaped lower rail 1, an elongate-shaped upper rail 2, an elongate-shaped screw rod 3, a nut member 4 screwed with the screw rod 3, and a holding member 5 rotatably holding the nut member 4. The seat slide structure has speed reduction means as described later.

The lower rail 1 has a right sidewall 12 as a first wall, a left sidewall 13 as a second wall, and a lower wall 14 as a third wall. The lower wall 14 connects between respective base ends of the right sidewall 12 and the left sidewall 13. Each of the right sidewall 12 and the left sidewall 13 extends upwardly from a respective one of opposite ends of the lower wall 14 in a widthwise direction thereof (widthwisely opposite ends of the lower wall 14). The right sidewall 12 and the left sidewall 13 are disposed opposed to each other in the rightward-leftward direction, while extending approximately parallel to each other in the frontward-rearward direction of the vehicle body. Each of the right sidewall 12 and the left sidewall 13 has a folded piece 15 folded inwardly from an upper end thereof. In other words, the lower rail 1 comprises a rail body with a cross-sectionally generally U-shape opened upwardly, and a pair of folded pieces 15. The lower rail 1 has a groove extending a longitudinal direction thereof.

The lower rail 1 is placed such that the lower wall 14 is located on a lowermost side, and the longitudinal direction is oriented along the frontward-rearward direction, and then fixed to a floor of the vehicle body by fastening means, such as a bolt, through the lower wall 14. The lower rail 1 is formed by subjecting a sheet metal to press forming such as bending.

The upper rail 2 has a right sidewall 22 as a first wall, a left sidewall 23 as a second wall, and an upper wall 24 as a third wall. The upper wall 24 connects between respective base ends of the right sidewall 22 and the left sidewall 23. Each of the right sidewall 22 and the left sidewall 23 extends downwardly from a respective one of opposite ends of the upper wall 24 in a widthwise direction thereof (widthwisely opposite ends of the upper wall 24). The right sidewall 22 and the left sidewall 23 are disposed opposed to each other in the rightward-leftward direction, while extending approximately parallel to each other in the frontward-rearward direction. Each of the right sidewall 22 and the left sidewall 23 has a folded piece 25 folded outwardly from a lower end thereof. In other words, the upper rail 2 comprises a rail body with a cross-sectionally generally U-shape opened downwardly, and a pair of folded pieces 25. The upper rail 2 has a groove extending a longitudinal direction thereof.

The upper rail 2 is placed such that the upper wall 24 is located on an uppermost side, and the longitudinal direction is oriented along the frontward-rearward direction, and then fixed to a vehicle seat (not shown) by fastening means, such as a bolt. The upper rail 2 is formed by subjecting a sheet metal to press forming such as bending.

Figure 5:
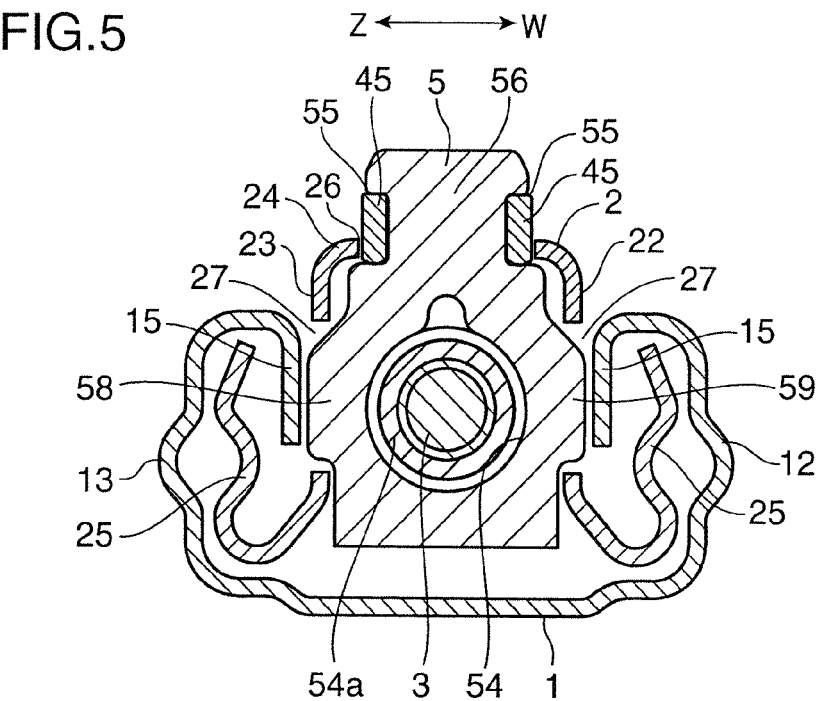
FIG. 5 is a sectional view taken along the line V-V in FIG. 4.
Figure 6:
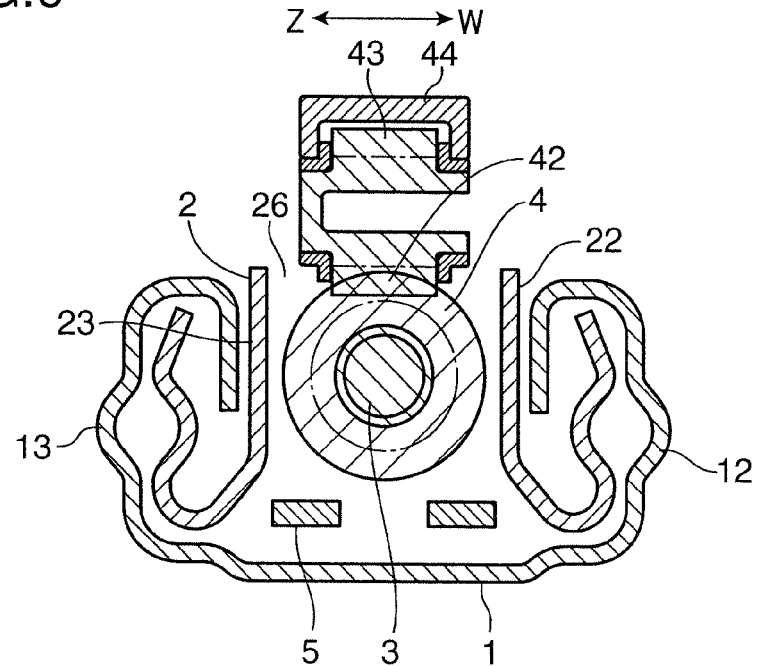
FIG. 6 is a sectional view taken along the line VI-VI in FIG. 4.

As shown in FIGS. 1 and 5, the upper rail 2 is installed in the groove of the lower rail 1 in such a manner that the folded pieces 25 on opposite sides thereof are engaged with respective ones of the folded pieces 15 of the lower rail 1, and adapted to be relatively movable with respect to the lower rail 1.

Figure 2:
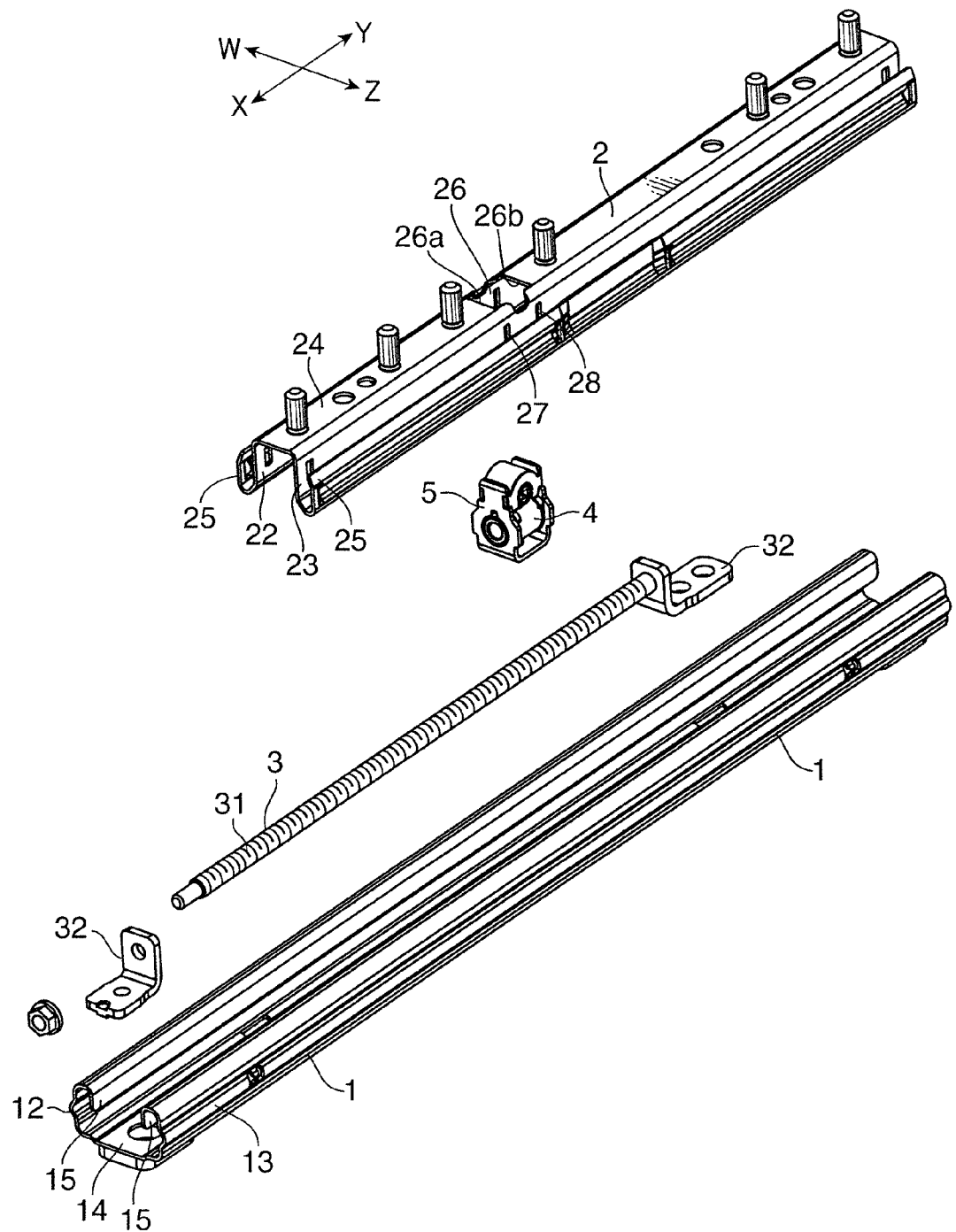
FIG. 2 is an exploded perspective view of the automobile seat slide structure in FIG. 1.

As shown in FIG. 2, the upper wall 24 is formed with a locking hole 26. The locking hole 26 is formed in a quadrangular (four-sided) shape defined by a front inner side-surface 26a and a rear inner side-surface 26b disposed opposed to each other in the frontward-rearward direction, and two inner side-surfaces disposed opposed to each other in the rightward-leftward direction.

Figure 11:
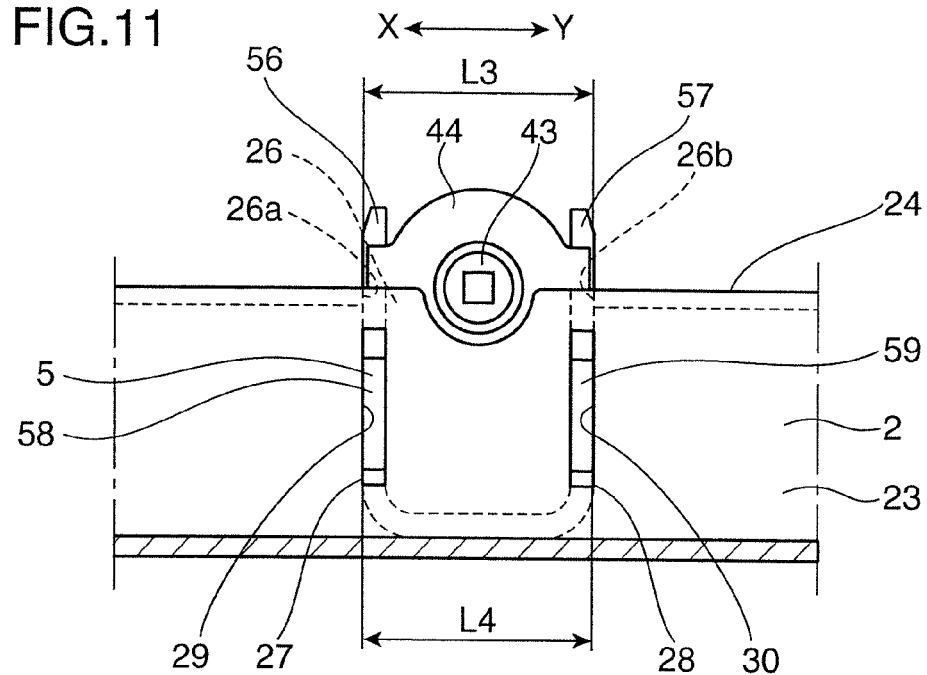
FIG. 11 is a fragmentary side view of the state after the holding member holding the nut member and the worm support member is assembled to the upper rail, in the first embodiment.

As shown in FIGS. 2, 5 and 11, each of the right sidewall 22 and the left sidewall 23 has an opening. The opening of the right sidewall 22 is comprised of two protruding-piece insertion holes (a front protruding-piece insertion hole 27 and a rear protruding-piece insertion hole 28) as a holding-member insertion hole. In the same manner, the opening of the left sidewall 23 is comprised of two protruding-piece insertion holes (a front protruding-piece insertion hole 27 and a rear protruding-piece insertion hole 28) as a holding-member insertion hole. Each of the four protruding-piece insertion holes has a slit-like shape extending in an upward-downward direction.

Each of the front protruding-piece insertion holes 27 is provided in the vicinity of the front inner side-surface 26a of the locking hole 26 in the frontward-rearward direction. Each of the rear protruding-piece insertion holes 28 is provided in the vicinity of the rear inner side-surface 26b of the locking hole 26 in the frontward-rearward direction. Specifically, as shown in FIG. 11, a distance L4 between a front inner side-surface 29 on a frontward side of the front protruding-piece insertion hole 27 and a rear inner side-surface 30 on a rearward side of the rear protruding-piece insertion hole 28 is approximately equal to a distance L3 between the front inner side-surface 26a and the rear inner side-surface 26b of the locking hole 26.

As shown in FIGS. 1 and 2, the screw rod 3 has an external thread 31 formed on an outer peripheral surface thereof over an approximately overall length thereof in its axial direction. The screw rod 3 is installed between the right sidewall 12 and the left sidewall 13 of the lower rail 1 in such a manner that the axial direction thereof is oriented along the longitudinal direction of the lower rail 1. Each of axially opposite ends of the screw rod 3 is fixed to the lower rail 1 by a mounting member 32.

Figure 3:
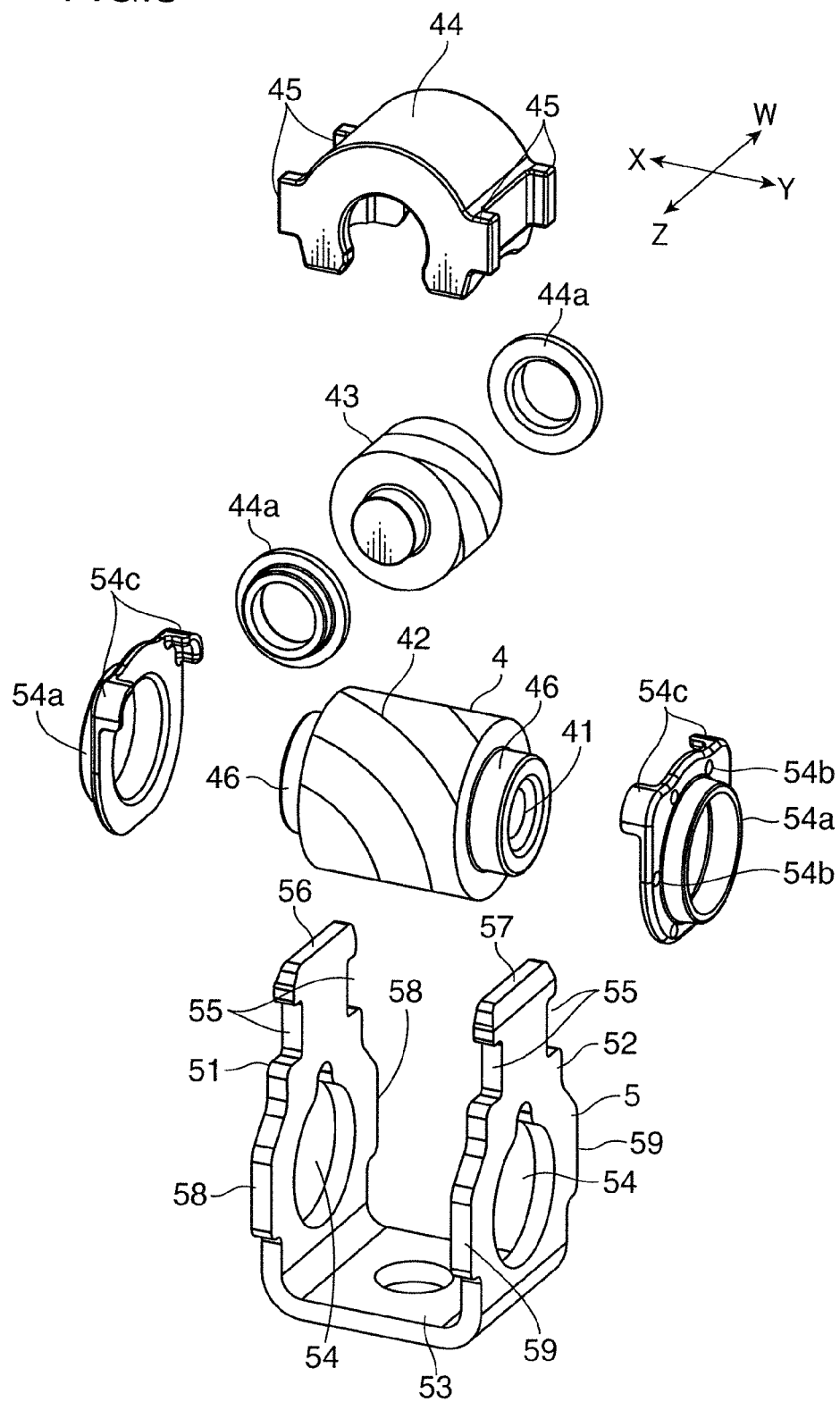
FIG. 3 is an exploded perspective view showing a positional relationship of a holding member, a nut member and a worm in the first embodiment.
Figure 4:
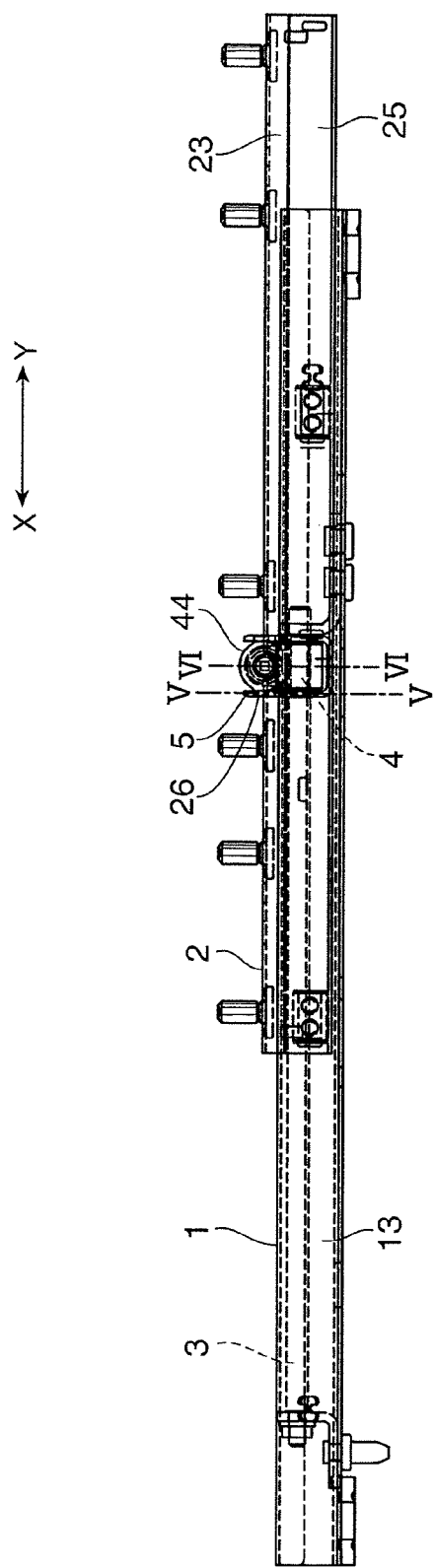
FIG. 4 is a side view of the automobile seat slide structure in FIG. 1.

As shown in FIG. 3, the nut member 4 has a cylindrical shape. The nut member 4 has two shaft portions 46 located at respective ones of axially opposite ends thereof, and a worm wheel portion 42 located between the shaft portions 46 and formed to have a diameter greater than that of each of the shaft portions 46. The worm wheel portion 42 has teeth meshable with an after-mentioned worm 43. The nut member 4 has a through-hole penetrating through an inside thereof along the axial direction. An internal thread 41 screwable with the external thread 31 of the screw rod 3 is formed on an inner peripheral surface of the through-hole.

The speed reduction means includes the worm wheel portion 42 and a worm 43 meshed with the worm wheel portion 42. The worm 43 is arranged such that an axial direction thereof becomes approximately perpendicular to the axial direction of the nut member 4. The worm 43 is connected to a motor (not shown) as drive means, via a coupling shaft (not shown), and adapted to be rotated according to rotation of the motor. In the seat slide structure according to the first embodiment, based on providing the speed reduction means, the nut member 4 can be rotated while reducing a rotational speed of the motor at a large speed reduction ratio.

The worm 43 is rotatably supported by a worm support member 44. The worm support member 44 has a generally semi-cylindrical shape opened downwardly. The worm support member 44 covers an upper portion of the worm 43, and rotatably supports a shaft portion of the worm 43 through a worm-supporting bush 44a, while allowing a lower portion of the worm 43 to be exposed. For example, the worm support member 44 may be made of a synthetic resin.

The worm support member 44 has a pair of retainable protruding pieces 45, 45 each protruding from a front end thereof in the frontward direction (X-direction). The front retainable protruding pieces 45 are located on respective ones of opposite ends of the worm support member 44 in the rightward-leftward direction (W-Z direction). The worm support member 44 further has a pair of retainable protruding pieces 45 each protruding from a rear end thereof in the rearward direction (Y-direction). The rear retainable protruding pieces 45 are also located on respective ones of opposite ends of the worm support member 44 in the rightward-leftward direction (W-Z direction).

The holding member 5 is a plate-shaped body obtained, for example, by forming a single sheet of metal plate having elasticity into a generally U shape as shown in FIG. 3 through bending (sheet metal working) The holding member 5 has a holding-member body, a lockable portion adapted to be inserted into the locking hole 26, and an insertable portion adapted to be inserted into the front protruding-piece insertion hole 27 and the rear protruding-piece insertion hole 28. The lockable portion is comprised of a pair of a first lockable portion 56 and a second lockable portion 57. The insertable portion is comprised of two first protruding pieces 58 and two second protruding pieces 59.

As shown in FIG. 3, the holding-member body has a plate-shaped front holding piece 51 as a first holding piece, a plate-shaped rear holding piece 52 as a second holding piece, and a plate-shaped connection piece 53 connecting between respective base ends (lower ends) of the front and rear holding pieces 51, 52. The holding-member body is a member located between the right sidewall 22 and the left sidewall 23 and below a lower surface of the upper wall 24. In other words, the holding-member body is a region surrounded by the right sidewall 22, the left sidewall 23 and the upper wall 24.

A principal surface of the connection piece 53 is approximately parallel to a horizontal direction. Each of the front holding piece 51 and the rear holding piece 52 extends upwardly (a direction approximately vertical to the connection piece 53) from a respective one of opposite ends of the connection piece 53 in the frontward-rearward direction. The front holding piece 51 and the rear holding piece 52 are disposed opposed to each other in the frontward-rearward direction with a distance enough to allow the nut member 4 and the worm support member 44 to be inserted between respective inner surfaces thereof.

Each of the front holding piece 51 and the rear holding piece 52 has a nut holding hole 54 adapted to hold a respective one of the shaft portions 46 at the opposite ends of the nut member 4, through a bush 54a made, for example, of a synthetic resin. Each of the nut holding hole 54 is a generally circular through-hole penetrating through a respective one of the front holding piece 51 and the rear holding piece 52 in the frontward-rearward direction. The nut member 4 is rotatably supported by the nut holding hole 54.

Each of the bushes 54a includes a cylindrical-shaped bush body adapted to allow a respective one of the shaft portions 46 of the nut member 4 to be inserted thereinto, and a flange portion protruding from one end of the bush body on the side of the worm wheel portion 42, in the form of an annular flange. An inner surface of the flange portion is brought into contact with an end surface of the worm wheel portion 42 facing in the frontward-rearward direction.

As shown in FIG. 3, the flange portion has a plurality of protrusions 54b formed along an outer periphery of the cylindrical-shaped bush body. Each of the protrusions 54b is formed to protrude in a direction opposite to the worm wheel portion 42, and adapted to be brought into contact with an inner surface of the front holding piece 51 or the rear holding piece 52, as described later.

As shown in FIG. 3, a pair of anti-rotation pieces 54c, 54c is formed at respective position on opposite sides of an upper region of the flange portion. Each of the anti-rotation pieces 54c is adapted to be brought into contact with a vicinity of a lower end of the worm support member 44, as shown in FIG. 7, to play a role in preventing the bush 54a from being rotated together with the nut member 4.

The holding member 5 has a pair of protruding-piece retention portions 55 at positions above the nut holding hole 54 of the front holding piece 51 and on right and left sides of the first lockable portion 56. Each of the front protruding-piece retention portions 55 is a concave portion concaved from a respective one of the right and left sides of the first lockable portion 56 inwardly in the widthwise direction (rightward-leftward direction). The holding member 5 further has a pair of protruding-piece retention portions 55 at positions above the nut holding hole 54 of the rear holding piece 52 and on right and left sides of the second lockable portion 57. Each of the rear protruding-piece retention portions 55 is a concave portion concaved from a respective one of the right and left sides of the second lockable portion 57 inwardly in the widthwise direction. The pair of front protruding-piece retention portions 55 and the pair of rear protruding-piece retention portions 55 are adapted to allow respective ones of the four retainable protruding pieces 45 of the worm support member 44 to be fitted thereinto. Based on the above structure, the worm support member 44 is supported by the holding member 5.

As shown in FIGS. 3 and 5, the first lockable portion 56 is located at a distal end of the front holding piece 51, and the second lockable portion 57 is located at a distal end of the rear holding piece 52. The first lockable portion 56 is a plate-shaped region integrally formed with the front holding piece 51 to protrude upwardly from the front holding piece 51. The second lockable portion 57 is a plate-shaped region integrally formed with the rear holding piece 52 to protrude upwardly from the rear holding piece 52. Each of the first lockable portion 56 and the second lockable portion 57 is a region located above the lower surface of the upper wall 24.

Figure 7:
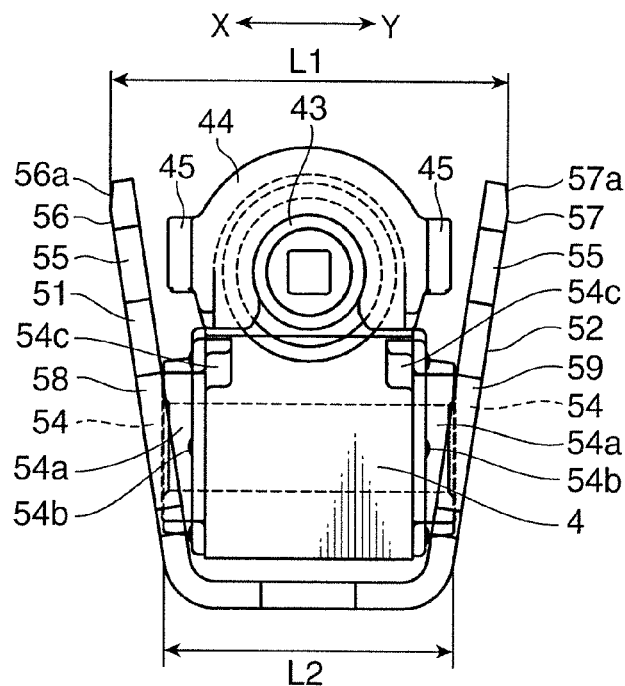
FIG. 7 is a diagram illustrating a state before the nut member and a worm support member is held by the holding member, in the first embodiment.

As shown in FIG. 7, in a normal state when no external force is applied to the holding member 5, a distance L1 between respective outer surfaces of the first lockable portion 56 and the second lockable portion 57 is greater than an opening size L3 of the locking hole 26 of the upper rail 2 in the frontward-rearward direction (distance L3 between the front inner side-surface 26a and the rear inner side-surface 26b of the locking hole 26). In the normal state, a distance between the front holding piece 51 and the rear holding piece 52 gradually increases in a direction from the base ends to the distal ends thereof (from the connection piece 53 toward the lockable portion). Further, in a state after the first lockable portion 56 and the second lockable portion 57 are inserted into the locking hole 26 and locked by the front inner side-surface 26a and the rear inner side-surface 26b, each of the front holding piece 51 and the rear holding piece 52 is set in a posture where it stands approximately vertically upwardly from the connection piece 53 (see FIG. 8).

Each of the first lockable portion 56 and the second lockable portion 57 has a guide region 56a, 57a formed on the distal end thereof. The guide region 56a of the first lockable portion 56 is formed such that an outer surface (a surface facing in the frontward direction) of the first lockable portion 56 is inclined to allow a thickness of the first lockable portion 56 to gradually decrease toward a top thereof (in an upward direction). The guide region 57a of the second lockable portion 57 is formed such that an outer surface (a surface facing in the rearward direction) of the second lockable portion 57 is inclined to allow a thickness of the second lockable portion 57 to gradually decrease toward a top thereof (in an upward direction). This provides a structure which makes it easy to insert the first lockable portion 56 and the second lockable portion 57 into the locking hole 26.

As shown in FIGS. 3 and 5, the two first protruding pieces 58 are located rightward and leftward of the front holding piece 51, and the two second protruding pieces 59 are located rightward and leftward of the rear holding piece 52. Each of the first protruding pieces 58 is a plate-shaped region integrally formed with the front holding piece 51 to protrude from the front holding piece 51 outwardly in the widthwise direction. Each of the second protruding pieces 59 is a plate-shaped region integrally formed with the rear holding piece 52 to protrude from the rear holding piece 52 outwardly in the widthwise direction.

As shown in FIG. 11, each of the first protruding pieces 58 is formed such that a thickness thereof in the frontward-rearward direction becomes slightly less than a width of a respective one of the front protruding-piece insertion holes 27 of the upper rail 2 in the frontward-rearward direction, and a length thereof in an upward-downward direction becomes less than an opening size of the front protruding-piece insertion hole 27 in the upward-downward direction. Thus, the first protruding piece 58 can be inserted into the front protruding-piece insertion hole 27, and moved within the front protruding-piece insertion hole 27 in the upward-downward direction.

In the same manner, each of the second protruding pieces 59 is formed such that a thickness thereof in the frontward-rearward direction becomes slightly less than a width of a respective one of the rear protruding-piece insertion hole 28 of the upper rail 2 in the frontward-rearward direction, and a length thereof in an upward-downward direction becomes less than an opening size of the rear protruding-piece insertion hole 28 in the upward-downward direction. Thus, the second protruding piece 59 can be inserted into the rear protruding-piece insertion hole 28, and moved within the rear protruding-piece insertion hole 28 in the upward-downward direction.

The above components are assembled together in the following manner. As shown in FIG. 7, the nut member 4 is placed between the front holding piece 51 and the rear holding piece 52, and each of the shaft portions 46 of the nut member 4 is inserted into a respective one of the nut holding holes 54 through the bush 54a. Then, the worm 43 supported by the worm support member 44 is placed on an upper portion of the nut member 4.

Figure 8:
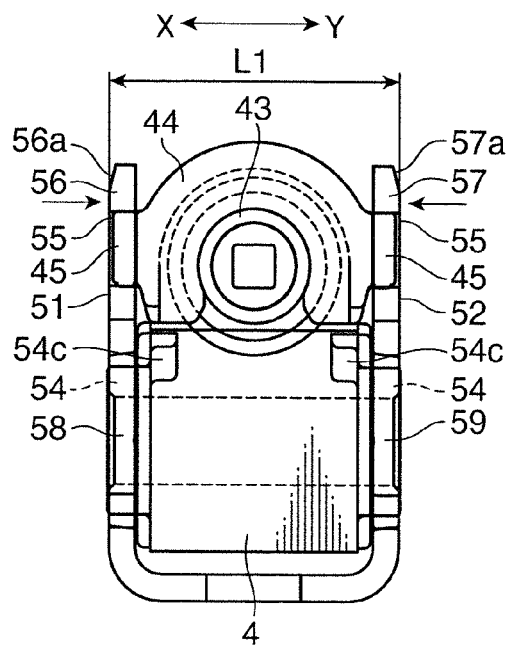
FIG. 8 is a diagram illustrating a state after the nut member and the worm support member are held by narrowing a distance between a front holding piece and a rear holding piece of the holding member from the state in FIG. 7.

Then, as shown in FIG. 8, a force is applied to the holding member 5 in a direction causing the first lockable portion 56 and the second lockable portion 57 to be moved close to each other, to narrow the distance L1 between the first lockable portion 56 and the second lockable portion 57 until the distance L1 becomes slightly less than the distance L3 (see FIG. 11) between the front inner side-surface 26a and the rear inner side-surface 26b of the locking hole 26. Thus, the front holding piece 51, the rear holding piece 52 and the connection piece 53 are elastically deformed, and thereby elastic energy is accumulated in the holding member 5. Although the holding member 5 is likely to be slightly bent during the elastic deformation, the illustration of such a bent state is omitted.

In the course of elastically deforming the holding member 5 in the above manner, the plurality of protrusions 54b (see FIG. 3) provided on each of the bushes 54a are brought into contact with the front holding piece 51 or the rear holding piece 52. Then, when the distance L1 becomes equal to or less than the distance L3, the protrusions 54b are pressed by the front holding piece 51 or the rear holding piece 52 and elastically deformed, so that a protruding height of each of the protrusions 54b is reduced.

In this state, the nut member 4 is rotatably supported by the nut holding hole 54 of the front holding piece 51 and the nut holding hole 54 of the rear holding piece 52 through the bushes 54a. Further, in this state, the retainable protruding pieces 45 of the worm support member 44 are fitted into the protruding-piece retention portions 55 of the front holding piece 51 and the protruding-piece retention portions 55 of the rear holding piece 52, so that the worm support member 44 is retained by the holding member 5 in an immovable manner with respect to the holding member 5.

Further, in this state, the worm wheel portion 42 of the nut member 4 and the worm 43 are set in a predetermined position to establish a meshed state between the worm wheel portion 42 and the worm 43. Further, during rotation of the nut member 4, the anti-rotation pieces 54c (see FIG. 3) provided on each of the bushes 54a are brought into contact with the worm support member 44 to prevent the bush 54a from being rotated together with the nut member 4.

Figure 9:
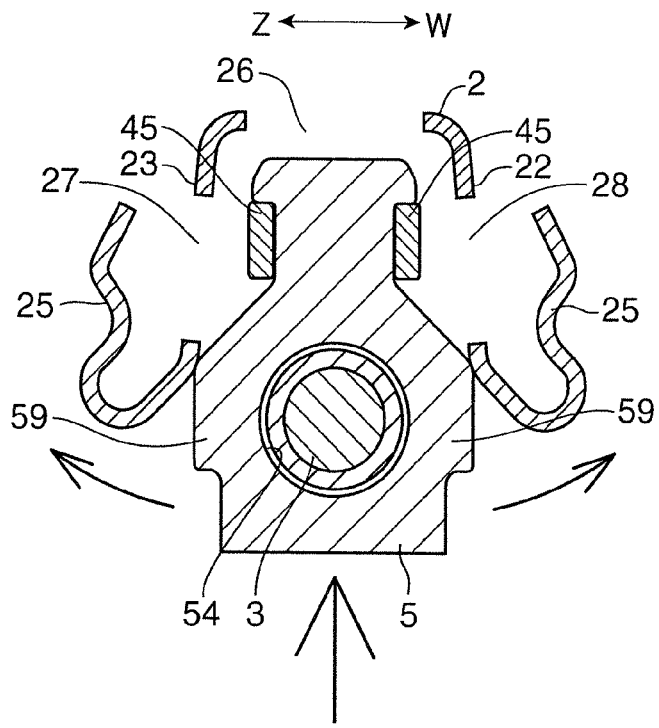
FIG. 9 is a diagram illustrating a state during an operation of assembling the holding member holding the nut member and the worm support member, to an upper rail, in the first embodiment.

Then, the tentative assembly tentatively assembled as shown in FIG. 8 is press-inserted into the groove of the upper rail 2 from below the upper rail 2, as shown in FIG. 9. During the press-insertion, a force is applied to the holding member 5 to allow the distance between the respective outer surfaces of the first protruding pieces 58 and the second protruding pieces 59 to become slightly less than the distance L4 between the front protruding-piece insertion hole 27 and the rear protruding-piece insertion hole 28 of the upper rail 2.

When the tentative assembly is press-inserted into the upper rail 2 from therebelow, the right sidewall 22 and the left sidewall 23 of the upper rail 2 are expanded against the rigidity of the upper rail 2 outwardly in the widthwise direction by the first protruding pieces 58 and the second protruding pieces 59. Thus, the holding member 5 can be press-inserted between the right sidewall 22 and the left sidewall 23.

Figure 10:
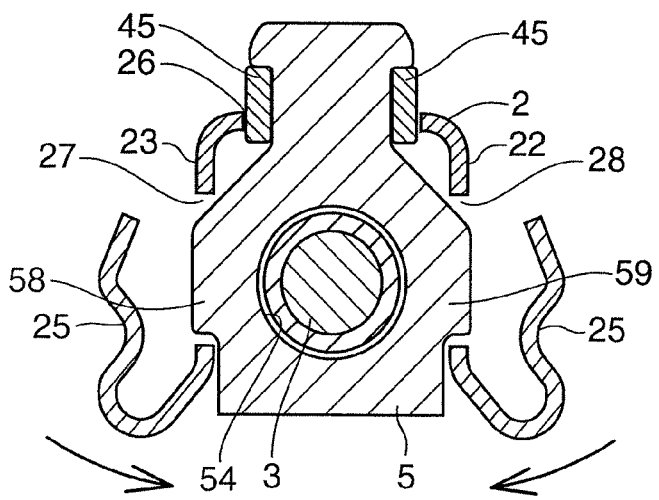
FIG. 10 is a diagram illustrating a state after the holding member holding the nut member and the worm support member is assembled to the upper rail, in the first embodiment.

Then, when the tentative assembly is press-inserted to a given position, the first protruding pieces 58 and the second protruding pieces 59 are fitted into the front protruding-piece insertion holes 27 and the rear protruding-piece insertion holes 28, and the expanded right and left sidewalls 22, 23 are returned to their original positions where the distance therebetween is narrowed, as shown in FIG. 10. Thus, each of the protruding pieces 58, 59 is fitted into a corresponding one of the insertion holes 27, 28. In this state, as shown in FIGS. 10 and 11, distal ends of the first lockable portion 56 and the second lockable portion 57 protrude from the locking hole 26 to an outside of the upper rail 2.

Then, the force (external force) applied to the holding member 5 in the direction causing the first lockable portion 56 and the second lockable portion 57 to be moved close to each other is released. Thus, the front holding piece 51, the rear holding piece 52 and the connection piece 53 having the elastic deformation are deformed in a direction causing the first lockable portion 56 and the second lockable portion 57 to be moved away from to each other (causing the distance L1 to increase in the frontward-rearward direction) by the elastic energy (restoring force) thereof. Then, the first lockable portion 56 and the second lockable portion 57 are brought into contact with respective ones of the front inner side-surface 26*a* and the rear inner side-surface 26*b* of the locking hole 26 to press the front inner side-surface 26*a* and the rear inner side-surface 26*b*. Specifically, the first lockable portion 56 presses the front inner side-surface 26*a* in the frontward direction, and the second lockable portion 57 presses the rear inner side-surface 26*b* in the rearward direction. Based on the pressing force, the first lockable portion 56 and the second lockable portion 57 are locked in the locking hole 26.

Further, as the distance L1 between the first lockable portion 56 and the second lockable portion 57 is increased, a degree of deformation of each of the protrusions 54*b* becomes smaller, and thereby the protruding height thereof becomes larger. As above, each of the protrusions 54*b* is deformed along with a change in the distance L1, so that it becomes possible to maintain the contact state between each of the bushes 54*a* and a respective one of the front holding piece 51 and the rear holding piece 52. This makes it possible to suppress the occurrence of a gap between the holding member 5 and each of the bushes 54*a*, and thus suppress deterioration in efficiency of force transmission from the nut member 4 to the holding member 5.

In the above manner, components, such as the holding member 5 and the nut member 4, are assembled to the upper rail 2. Further, the nut member 4 is screwed with the screw rod 3. The worm 43 is connected to a motor (not shown) via a coupling shaft (not shown).

An operation of the seat slide structure according to the first embodiment will be described below. Upon activation of the motor, the worm 43 is rotated according to rotation of the motor. The nut member 4 having the worm wheel portion 42 meshed with the worm 43 is rotated under a condition that a rotational speed of the motor is reduced by the speed reduction means.

According to the rotation, the nut member 4 is relatively moved with respect to the screw rod 3 screwed therewith, in the axial direction (frontward-rearward direction). In the first embodiment, the screw rod 3 is fixed to the lower rail 1, so that the nut member 4 is moved back and forth along the axial direction of the screw rod 3.

During the forward and back movement of the nut member 4, the holding member 5 holding the nut member 4 is moved together with the nut member 4. When the holding member 5 is moved, the upper rail 2 assembled with the holding member 5 is moved together with the holding member 5, and thereby a seat with the upper rail 2 fixed thereto is moved with respect to a vehicle body in the frontward-rearward direction.

Figure 27:
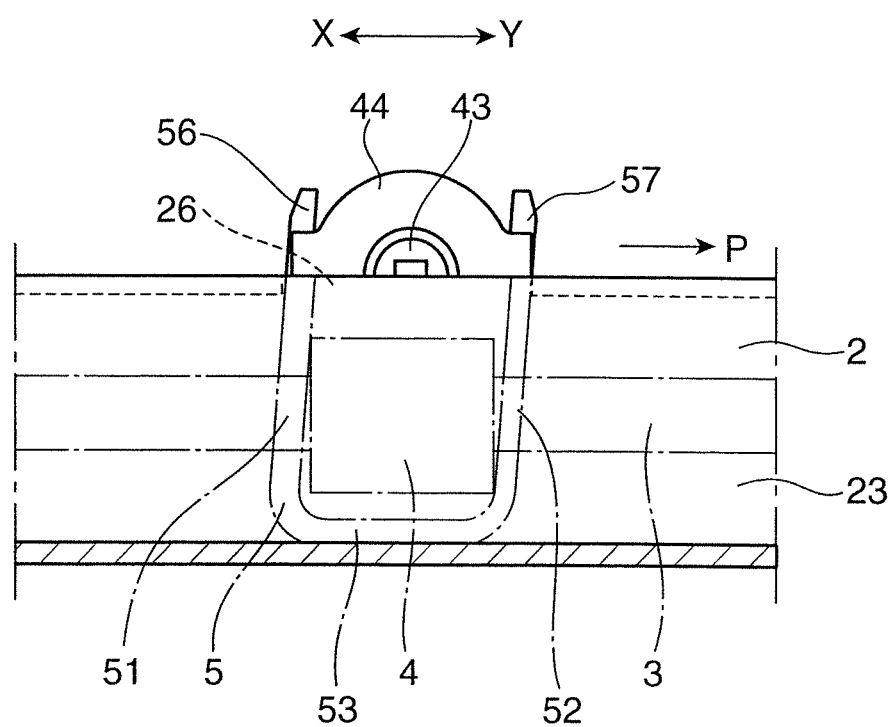
FIG. 27 is a diagram illustrating a reference example devoid of the protruding-piece insertion hole and the protruding piece.
Figure 28:
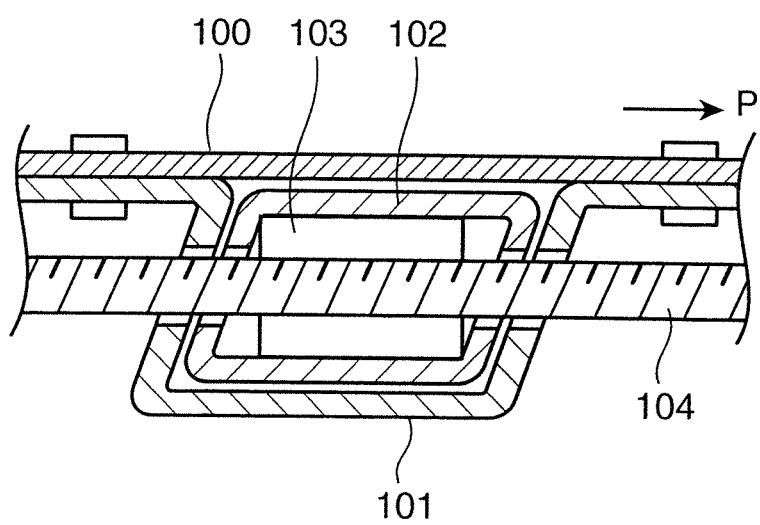
FIG. 28 is a sectional view showing a state after a holding member is deformed, in a conventional automobile seat slide structure.

For example, when a force is applied to the seat in the frontward-rearward direction, the force is transmitted from the upper rail 2 to the holding member. Then, when the force is applied to the nut member via the holding member, a resulting reaction force is applied to the holding member to cause elastic deformation of the holding member. In cases where a holding member is devoid of the protruding pieces 58, 59 in the first embodiment, as shown in FIG. 27, if the reaction force to be applied to the holding member becomes larger, the holding member is further deformed, which is likely to cause plastic deformation.

In contrast, in the first embodiment, the holding member 5 has the first protruding pieces 58 and the second protruding pieces 59, and each of the right sidewall 22 and the left sidewall 23 has the front protruding-piece insertion hole 27 and the rear protruding-piece insertion hole 28. Thus, for example, when the reaction force is applied to the holding member 5 in the frontward direction, the front holding piece 51 of the holding member 5 is elastically deformed in the frontward direction, and each of the first protruding pieces 58 is brought into contact with the front inner side-surface 29 of a corresponding one of the front protruding-piece insertion holes 27. Therefore, the reaction force applied to the holding member 5 can be received by the first protruding pieces 58 and the front inner side-surfaces 29 to support the holding member 5.

Otherwise, when the reaction force is applied to the holding member 5 in the rearward direction, the rear holding piece 52 of the holding member 5 is elastically deformed in the rearward direction, and each of the second protruding pieces 59 is brought into contact with the rear inner side-surface 30 of a corresponding one of the rear protruding-piece insertion holes 28. Therefore, the reaction force applied to the holding member 5 can be received by the second protruding pieces 59 and the rear inner side-surfaces 30 to support the holding member 5. As above, the seat slide structure according to the first embodiment can suppress deformation of the holding member 5 to maintain a state allowing the nut member 4 supported by the holding member 5 to be smoothly rotated.

<Second Embodiment>

An automobile seat slide structure according to a second embodiment of the present invention will be described below. In the following figures, an element or component equivalent to that in the first embodiment is defined by the same reference numeral or code as that in the first embodiment, and its description will be omitted.

As shown in FIGS. 14 to 19, the seat slide structure according to the second embodiment comprises an elongate-shaped lower rail 1, an elongate-shaped upper rail 2, an elongate-shaped screw rod 3, a nut member 4 screwed with the screw rod 3, and a holding member 5 rotatably holding the nut member 4. This seat slide structure has speed reduction means equivalent to that in the first embodiment.

Each of the lower rail 1, the screw rod 3 and the holding member 5 in the second embodiment is substantially the same as a corresponding one of those in the first embodiment. As shown in FIGS. 15, 16, 19 and 24, the seat slide structure according to the second embodiment is different from the first embodiment in terms of elements of an opening provided in each of a right sidewall 22 and a left sidewall 23 of an upper rail 2, and a part of a structure of a nut member 4. The following description will be made mainly about the differences from the first embodiment.

Figure 15:
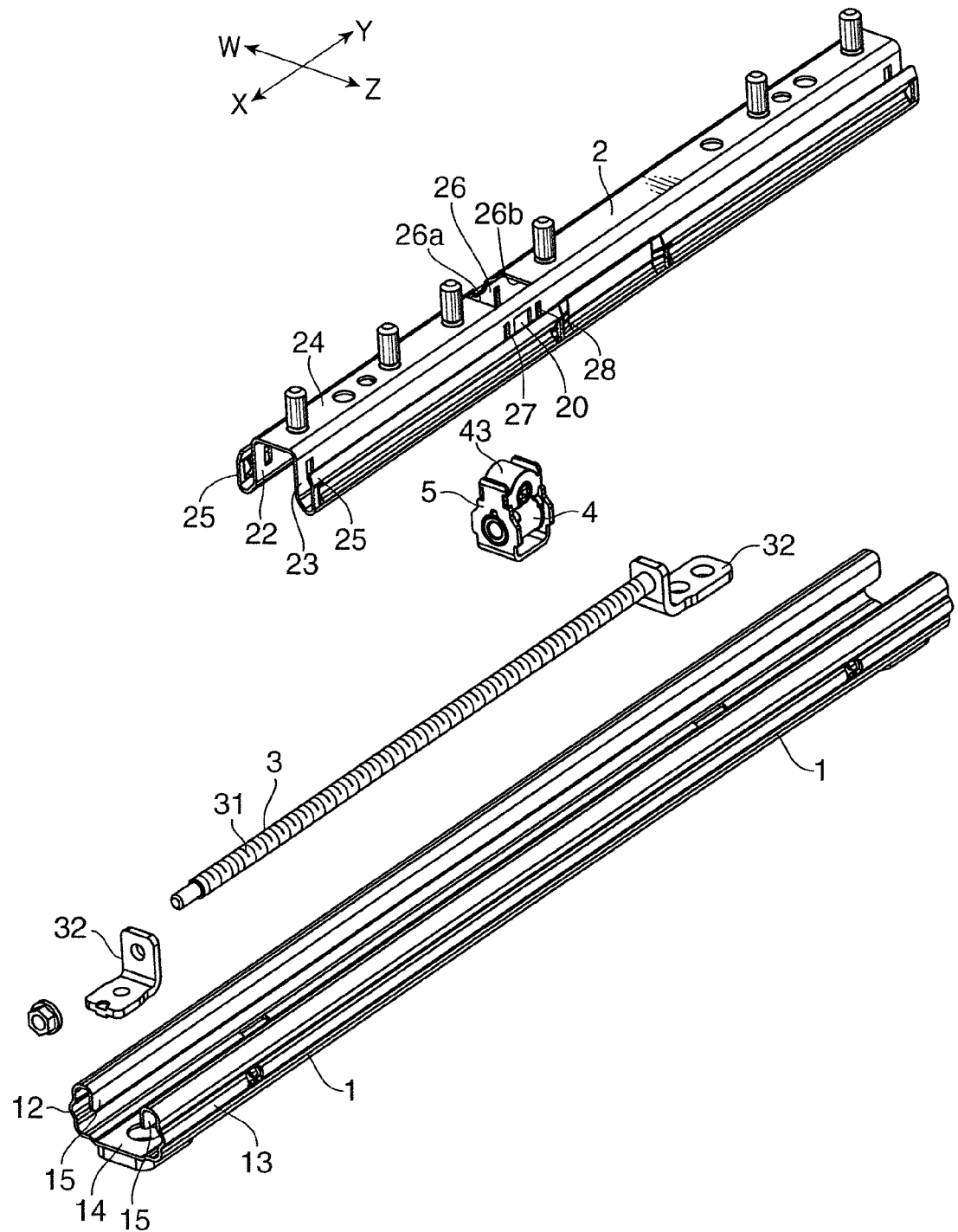
FIG. 15 is an exploded perspective view of the automobile seat slide structure in FIG. 14.
Figure 24:
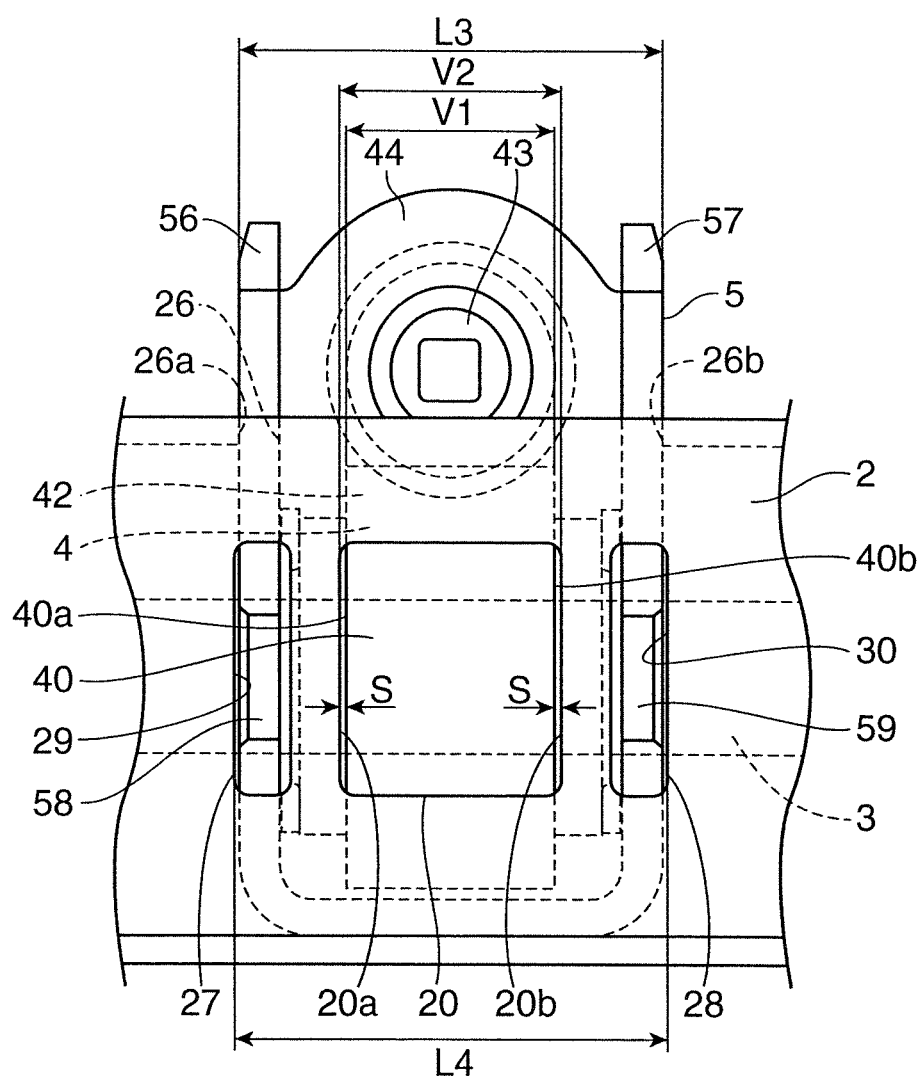
FIG. 24 is a fragmentary side view of the state after the holding member holding the nut member and the worm support member is assembled to the upper rail, in the second embodiment.

As shown in FIGS. 15 and 24, the upper rail 2 has the opening in each of the right sidewall 22 and the left sidewall 23. Each of the openings includes a nut-receiving hole 20, in addition to a pair of a slit-shaped front protruding-piece insertion hole 27 and a slit-shaped rear protruding-piece insertion hole 28 which are the same elements as those in the first embodiment. The nut-receiving hole 20 is an oblong-shaped through-hole provided between the front protruding-piece insertion hole 27 and the rear protruding-piece insertion hole 28, independently of the front protruding-piece insertion hole 27 and the rear protruding-piece insertion hole 28. In other words, each of the openings includes three holes consisting of the front protruding-piece insertion hole 27, the rear protruding-piece insertion hole 28 and the nut-receiving hole 20. The three holes are arranged side-by-side at intervals in the frontward-rearward direction.

As shown in FIG. 24, a distance L4 between a front inner side-surface 29 on a frontward side of the front protruding-piece insertion hole 27 and a rear inner side-surface 30 on a rearward side of the rear protruding-piece insertion hole 28 is greater than a distance L3 between a front inner side-surface 26a and a rear inner side-surface 26b of a locking hole 26.

Figure 16:
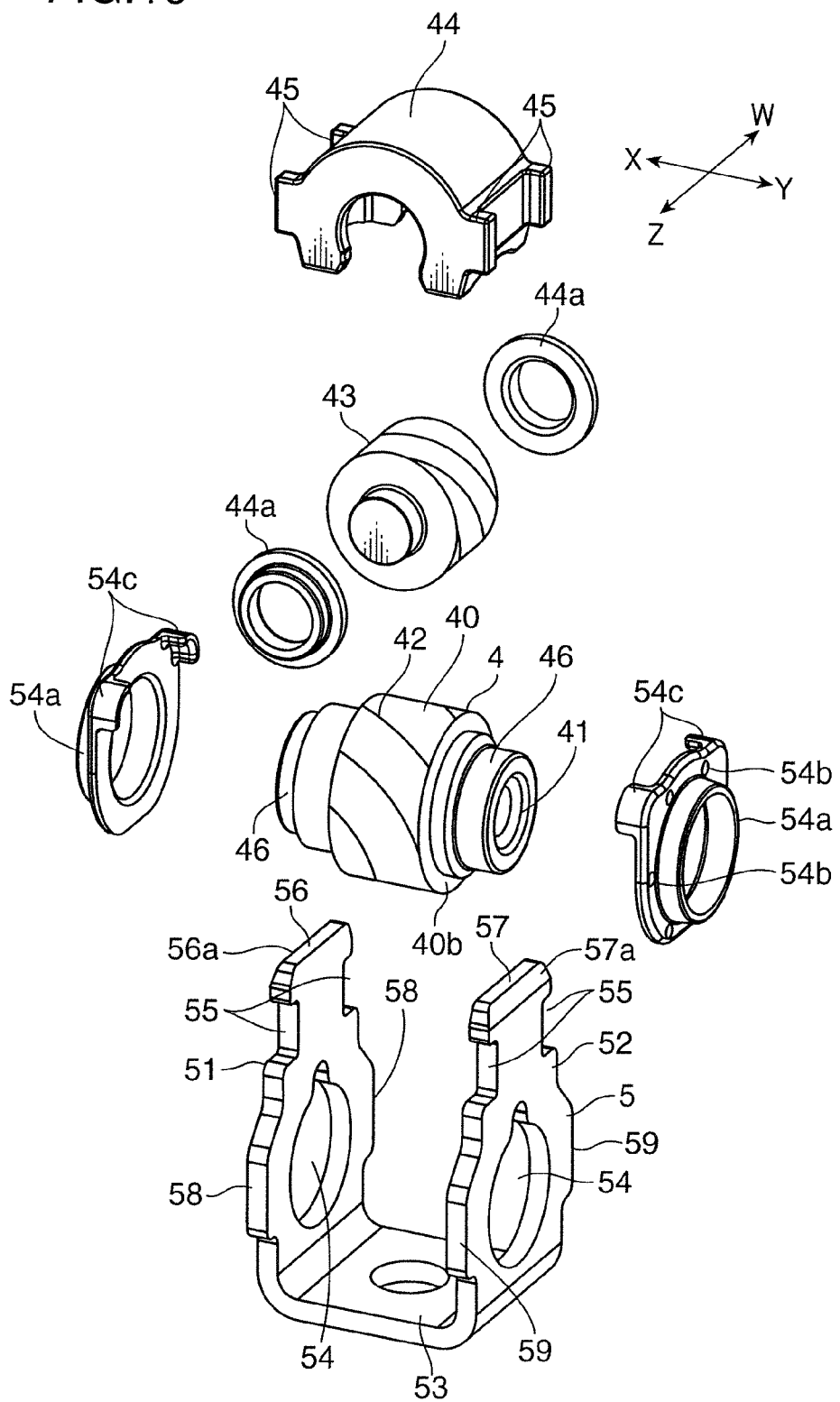
FIG. 16 is an exploded perspective view showing a positional relationship of a holding member, a nut member and a worm in the second embodiment.
Figure 17:
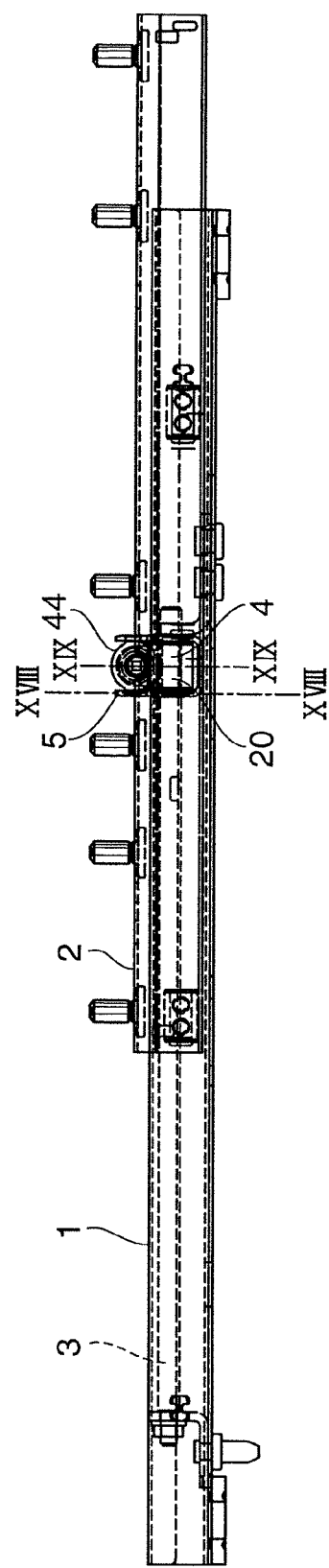
FIG. 17 is a side view of the automobile seat slide structure in FIG. 14.
Figure 18:
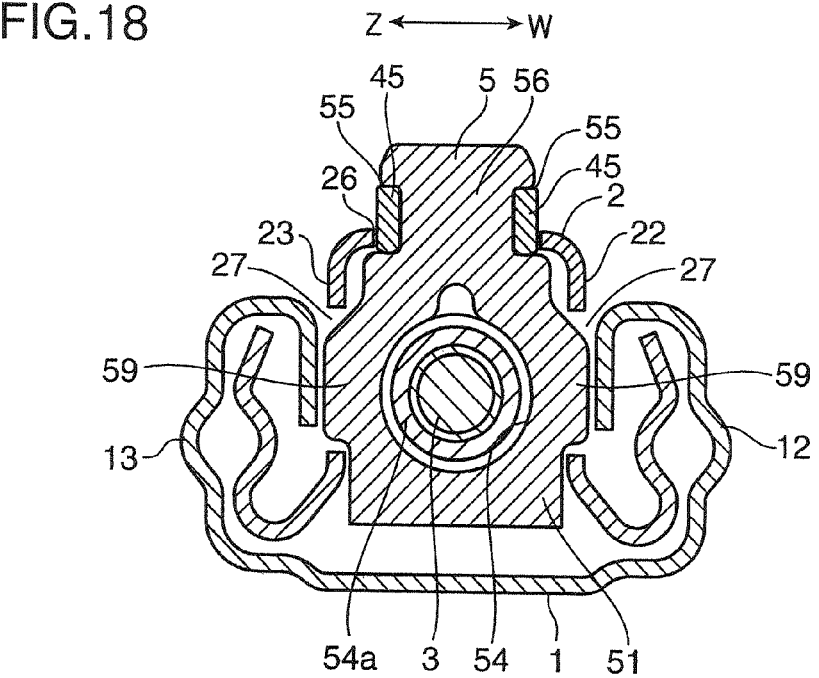
FIG. 18 is an end view taken along the line XVIII-XVIII in FIG. 17.
Figure 19:
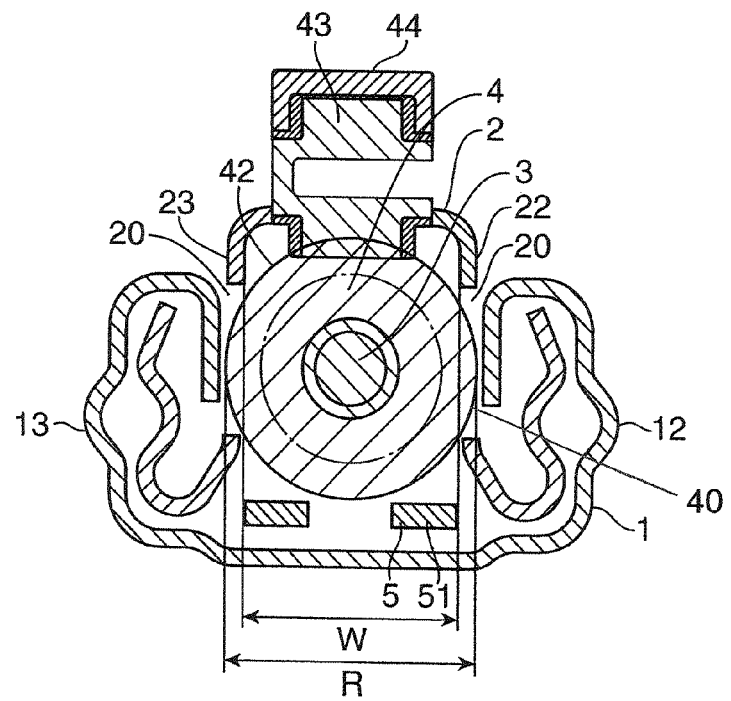
FIG. 19 is an end view taken along the line XIX-XIX in FIG. 17.
Figure 20:
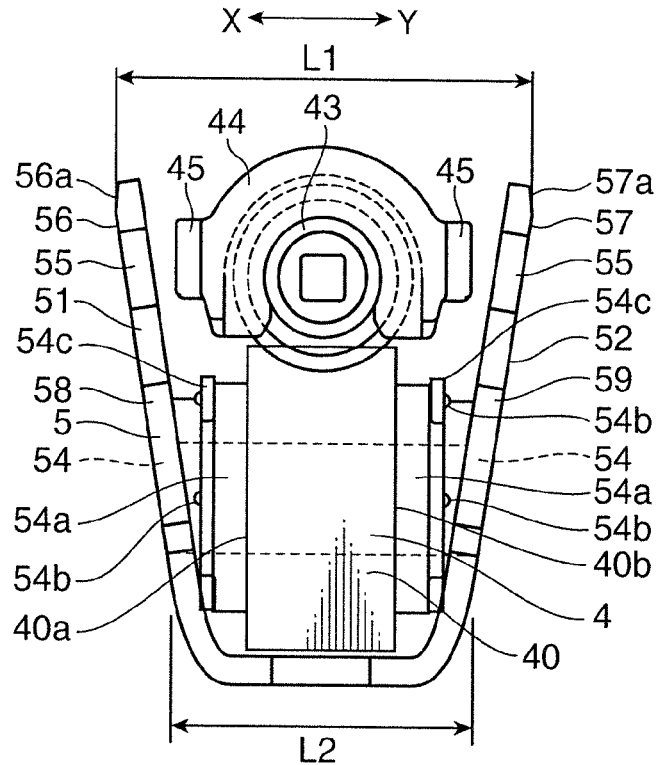
FIG. 20 is a diagram illustrating a state before the nut member and a worm support member is held by the holding member, in the second embodiment.
Figure 21:
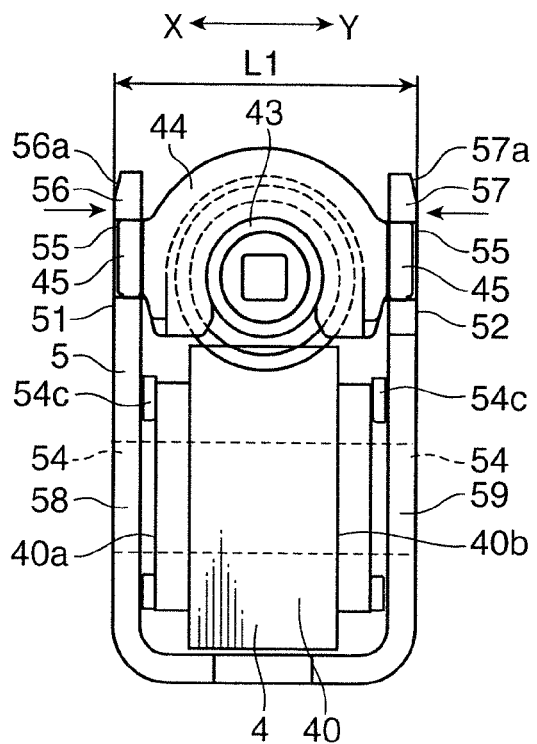
FIG. 21 is a diagram illustrating a state after the nut member and the worm support member are held by narrowing a distance between a front holding piece and a rear holding piece of the holding member from the state in FIG. 20.
Figure 22:
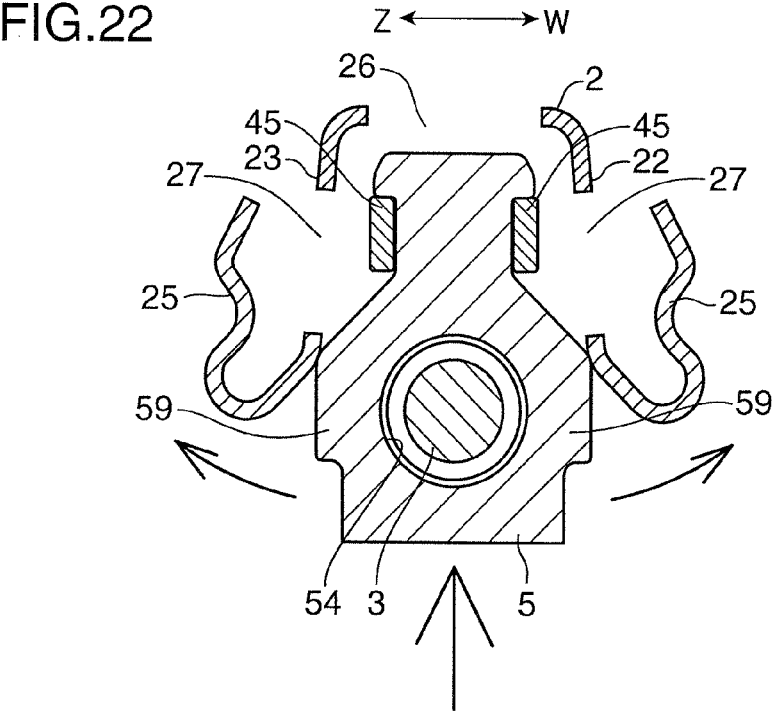
FIG. 22 is a diagram illustrating a state during an operation of assembling the holding member holding the nut member and the worm support member, to an upper rail, in the second embodiment.
Figure 23:
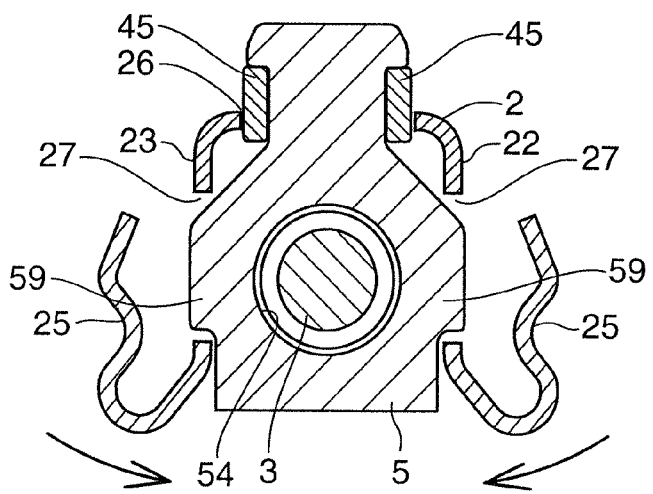
FIG. 23 is a diagram illustrating a state after the holding member holding the nut member and the worm support member is assembled to the upper rail, in the second embodiment.

As shown in FIG. 16, the nut member 4 has a large-diameter portion 40 formed in a widthwisely approximately central region thereof to have a diameter greater than that of each of two shaft portions 46 at opposite ends thereof. As shown in FIG. 19, the large-diameter portion 40 has an outer diameter R greater than a distance W between respective inner surfaces of the right sidewall 22 and the left sidewall 23. Further, as shown in FIG. 24, the large-diameter portion 40 has an axial length V1 slightly less than an opening size V2 (in the frontward-rearward direction) of the nut-receiving hole 20 of each of the right sidewall 22 and the left sidewall 23 of the upper rail 2.

Thus, under a condition that the nut member 4 is disposed between the right sidewall 22 and the left sidewall 23 of the upper rail 2 while being screwed with the screw rod 3, a part of each of axially opposite end surfaces (a front surface 40a and a rear surface 40b) of the large-diameter portion 40 is inserted in the nut-receiving hole 20 of each of the right sidewall 22 and the left sidewall 23 of the upper rail 2. The front surface 40a is formed in an annular shape, and disposed to extend in a direction approximately vertical to the frontward-rearward direction and face in the frontward direction. The rear surface 40b is formed in an annular shape, and disposed to extend in a direction approximately vertical to the frontward-rearward direction and face in the rearward direction.

A region of the front surface 40a of the large-diameter portion 40 inserted in the nut-receiving hole 20 is disposed opposed to a front inner side-surface 20a of the nut-receiving hole 20 with a minute gap S therebetween. A region of the rear surface 40b of the large-diameter portion 40 inserted in the nut-receiving hole 20 is disposed opposed to a rear inner side-surface 20b of the nut-receiving hole 20 with a minute gap S therebetween. As used herein, the term "minute gap S" means a small gap enough to prevent the nut member 4 being rotated to from coming into contact with the front inner side-surface 20a and the rear inner side-surface 20b. Specifically, the minute gap S is preferably set in the range of 0.5 to 5 mm, more preferably in the range of 1 to 3 mm.

The components in the second embodiment are assembled by a process illustrated in FIGS. 20 to 23, and the process is similar to the assembling process in the first embodiment. Thus, its detailed description will be omitted. A difference from the first embodiment in terms of the assembling process is as follows. In the second embodiment, when the tentative assembly is press-inserted to a given position, i.e., moved from the state illustrated in FIG. 22 to the state illustrated FIG. 23, two first protruding pieces 58 and two second protruding pieces 59 of the holding member 5 are fitted into respective ones of the front protruding-piece insertion holes 27 and the rear protruding-piece insertion holes 28 of the upper rail 2, and further the large-diameter portion 40 is fitted into the nut-receiving holes 20.

An operation of the seat slide structure according to the second embodiment is also similar to that in the first embodiment, and only a difference therebetween will be described below.

In the second embodiment, the first protruding pieces 58 and the second protruding pieces 59 of the holding member 5 are inserted in the front protruding-piece insertion holes 27 and the rear protruding-piece insertion hole 28 of the right sidewall 22 and the left sidewall 23, and a part of the large-diameter portion 40 of the nut member 4 is inserted in the nut-receiving holes 20.

When the upper rail 2 is moved with respect to the nut member 4 in the frontward or rearward direction, the front inner side-surface 20a or the rear inner side-surface 20b of the nut-receiving hole 20 is brought into contact with a part of the front surface 40a or a part of the rear surface 40b of the large-diameter portion 40, the reaction force from the nut member 4 is also applied to the front inner side-surface 20a or the rear inner side-surface 20b of the nut-receiving hole 20. Thus, a force to be applied from the nut member 4 to the holding member 5 can be reduced to suppress deformation of the holding member 5.

Further, in the second embodiment, the front inner side-surface 20a or the rear inner side-surface 20b of the nut-receiving hole 20 is brought into contact with the front surface 40a or the rear surface 40a of the large-diameter portion 40 of the nut member 4. At approximately the same timing as the above contact, the front inner side-surfaces 29 of the front protruding-piece insertion holes 27 or the rear inner side-surfaces 30 of the rear protruding-piece insertion holes 28 are brought into contact with the first protruding pieces 58 or the second protruding pieces 59. Thus, the reaction force to be applied from the nut member 4 to the holding member 5 can be supported not only by the large-diameter portion 40 but also by the first protruding pieces 58 or the second protruding pieces 59. Consequently, the holding member 5 becomes less likely to be deformed.

The first and second embodiments can be summarized as follows.

In the seat slide structure according to each of the first and second embodiment, at least one of the first wall and the second wall has an opening, and at least one of a part of the holding member and a part of the nut member is inserted in the opening and disposed opposed to an inner side-surface of the opening facing in the frontward-rearward direction.

In this seat slide structure, when the holding member is elastically deformed due to the reaction force applied from the nut member to the holding member, the part of the holding member and/or the part of the nut member is brought into contact with the inner side-surface of the opening to suppress further deformation of the holding member. This makes it possible to suppress deformation of the holding member. In addition, a need for increasing a plate thickness of the holding member to suppress deformation thereof as in the conventional structure can be eliminated to downsize the holding member.

Specifically, in a preferred aspect of the present invention, as in the first and second embodiments, the holding member has a holding-member body located between the first wall and the second wall, and an insertable portion located outward of the holding-member body in the widthwise direction to serve as the part of the holding member. In this case, the opening includes a holding-member insertion hole adapted to allow the insertable portion to be inserted thereinto, and the insertable portion is disposed opposed to an inner side-surface of the holding-member insertion hole facing in the frontward-rearward direction.

In this seat slide structure, the insertable portion of the holding member is inserted in the holding-member insertion hole. Thus, for example, when the reaction force is applied to the holding member in the frontward direction, the holding member is deformed in the frontward direction, and the insertable portion is brought into contact with the front inner side-surface of the holding-member insertion hole. Otherwise, when the reaction force is applied to the holding member in the rearward direction, the holding member is deformed in the rearward direction, and the insertable portion is brought into contact with the rear inner side-surface of the holding-member insertion hole. This makes it possible to suppress deformation of the holding member.

More specifically, in another preferred aspect of the present invention, as in the first and second embodiments, the holding-member body includes a pair of plate-shaped first and second holding pieces disposed opposed to each other with a distance therebetween in the frontward-rearward direction, wherein the first holding piece is adapted to hold a front end of the nut member, and the second holding piece is adapted to hold a rear end of the nut member. In this case, the insertable portion includes two plate-shaped first protruding pieces protruding from the first holding piece toward respective ones of opposite first and second sides in the widthwise direction, and two plate-shaped second protruding pieces protruding from the second holding piece toward respective ones of the first and second sides in the widthwise direction, and the holding-member insertion hole is comprised of a plurality of slits each adapted to allow a respective one of the first and second protruding pieces to be inserted thereinto.

In this seat slide structure, the insertable portion includes the pair of first protruding pieces provided on respective ones of widthwisely opposite sides of the first holding piece and the pair of second protruding pieces provided on respective ones of widthwisely opposite sides of the second holding piece, so that it becomes possible to support the holding member at two front positions and two rear positions. This makes it possible to enhance the effect of suppressing deformation of the holding body. Consequently, it also becomes possible to further reduce the plate thickness of the holding member to further downsize the holding member.

In another preferred aspect of the present invention, as in the first and second embodiments, the remaining one of the lower rail and the upper rail (the lower or upper rail provided with the holding member) has a locking hole adapted to lock the holding member. In this case, the holding member has a first lockable portion and a second lockable portion disposed opposed to each other with a distance therebetween in the frontward-rearward direction, wherein the holding member is adapted to be elastically deformable in the frontward-rearward direction, and the first lockable portion and the second lockable portion is adapted, under a condition that a force against an elastic force of the holding member is applied thereto to narrow a distance therebetween in the frontward-rearward direction, to become insertable into the locking hole, and, under a condition that the force against the elastic force is released after the insertion into the locking hole, to be locked in the locking hole while pressing respective inner side-surfaces of the locking hole facing in the frontward-rearward direction.

In this seat slide structure, for example, under a condition that a force is applied to the holding member in a direction causing a distance between the first lockable portion and the second lockable portion to be narrowed, the first lockable portion and the second lockable portion can be inserted into the locking hole. Then, under a condition that the force is released, the first lockable portion and the second lockable portion are locked in the locking hole while pressing the respective inner side-surfaces of the locking hole facing in the frontward-rearward direction.

Thus, in this seat slide structure, the holding member can be assembled to the lower or upper rail without using fastening member, such as a bolt or a pin, for assembling the holding member to the lower or upper rail. In addition, the holding member is locked in the locking hole based on an elastic force thereof, so that, even if the holding member receives vibration or the like, a wobbling movement thereof can be reduced. Furthermore, it becomes possible to prevent a wobbling movement of the holding member when it receives vibration or the like, due to loosening of a bolt or the like for locking the holding body.

When the nut member screwed with the screw rod is moved in the axial direction of the screw rod, a slight displacement in a radial direction of the screw rod also occurs due to production errors, a distortion of the screw rod, etc. Thus, for example, if the holding member is fixed to the upper rail or the lower rail, and the nut member is held by the fixed holding member in a relatively immovable manner, the nut member becomes less likely to be displaced in the radial direction of the screw rod. This hinders a smooth movement of the nut member in the axial direction of the screw rod. Therefore, it is necessary to hold the nut member in such a manner that it can be relatively moved with respect to the holding member to some extent. However, if a level of the relative displacement is increased, force transmission efficiency is likely to deteriorate.

For this reason, for example, in the seat slide structure disclosed in the 2004-106713A, the nut member is held by the holding member through the gearbox. However, if such a gearbox is provided, the number of components will be increased, which leads to an increase in cost. Moreover, the holding member is required to ensure a space for placing the gearbox, which causes difficulty in downsizing the holding member. In the seat slide structure disclosed in the 2004-106713A, it is necessary to assemble the nut member and the worm to the gearbox in a rotatable manner. It is also necessary to assemble the nut member and the worm to the gearbox while maintaining a meshed state between the nut member and the worm. This gives rise to a need for forming the gearbox with high strength and a high degree of accuracy, which also leads to an increase in cost.

In contract, in the above seat slide structure, the first lockable portion and the second lockable portion are inserted into the locking hole and locked in the locking hole based on the elastic force of the holding member. Thus, even if the nut member is held by the holding member in a relatively immovable manner with respect to the holding member, the nut member is allowed to be displaced in the radial direction of the screw rod. Specifically, the first lockable portion and the second lockable portion of the holding member can be slidably displaced along the inner side-surfaces of the locking hole, and thereby the nut member can be displaced in the radial direction of the screw rod. Thus, in the above seat slide structure, the nut member can be held by the holding member in a relatively immovable manner with respect to the holding member, so that a force is effectively transmitted from the nut member to the holding member.

In another preferred aspect of the present invention, as in the first and second embodiments, the above seat slide structure further comprises a worm adapted to be rotated by drive means, such as a motor, and a worm support member which rotatably supports the worm. In this case, the nut member has a worm wheel portion provided in an outer periphery thereof and meshed with the worm, and the worm support member is supported by the holding member in such a manner as to maintain the meshed state between the worm wheel portion and the worm.

In this seat slide structure, the worm is rotatably held by the worm support member. The holding member holds the nut member, and supports the worm support member in such a manner as to maintain the meshed state between the worm wheel portion and the worm. Thus, in this seat slide structure, through an operation of allowing the worm support member to be held by the holding member, the worm and the worm wheel portion can be positionally aligned with each other and meshed with each other. Then, through an operation of assembling the holding member holding the worm support member to the lower or upper rail, the worm and the worm wheel portion can be installed in the lower or upper rail while maintaining the meshed state between the worm and the worm wheel portion. Thus, a need for providing the gearbox for assembling the worm and the nut member together as in the conventional structure can be eliminated, which makes it possible to downsize the holding member so as to downsize the lower and upper rails in their entireties and achieve a low production cost.

In another preferred aspect of the present invention, as in the second embodiment, the opening includes a nut-receiving hole adapted to allow the part of the nut member to be inserted thereinto. In this case, the nut member is disposed such that an axial direction thereof is oriented in the frontward-rearward direction to have a frontwardly-facing front surface and a rearwardly-facing rear surface, and the part of the nut member to be inserted into the nut-receiving hole includes a part of the front surface and a part of the rear surface, wherein the part of the front surface is disposed opposed to a front inner side surface of the nut-receiving hole, and the part of the rear surface is disposed opposed to a rear inner side surface of the nut-receiving hole.

In this seat slide structure, when the upper rail is moved with respect to the nut member in the frontward direction or in the rearward direction, the part of the nut member comes into contact with the front inner side-surface or the rear inner side-surface of the nut-receiving hole. Thus, the reaction force from the nut member is additionally applied to the front inner side-surface or the rear inner side-surface of the nut-receiving hole. This makes it possible to reduce the reaction force to be applied from the nut member to the holding member to suppress deformation of the holding member.

In another preferred aspect of the present invention, as in the second embodiment, the part of the front surface is disposed opposed to the front inner side surface of the nut-receiving hole through a minute gap, and the part of the rear surface is disposed opposed to the rear inner side surface of the nut-receiving hole through a minute gap.

In this seat slide structure, when the upper rail is moved with respect to the nut member in the frontward direction or in the rearward direction, the nut member comes into contact with the inner side-surface of the nut-receiving hole after the nut member is displaced only by a distance corresponding to the minute gap. This makes it possible to further reduce deformation of the holding member.

In another preferred aspect of the present invention, as in the second embodiment, the nut-receiving hole is provided in each of the first wall and the second wall. In this case, the nut member has a large-diameter portion with an outer diameter greater than a distance in the widthwise direction between respective inner surfaces of the first wall and the second wall, wherein the large-diameter portion includes the front surface and the rear surface, and wherein a region of the large-diameter portion on the first side in the widthwise direction is inserted in the nut-receiving hole of the first wall, and a region of the large-diameter portion on the second side in the widthwise direction is inserted in the nut-receiving hole of the second wall.

In this seat slide structure, the region of the large-diameter portion on the first side in the widthwise direction is inserted in the nut-receiving hole of the first wall, and the region of the large-diameter portion on the second side in the widthwise direction is inserted in the nut-receiving hole of the second wall. Thus, when the upper rail is moved with respect to the nut member in the frontward direction or in the rearward direction, the large-diameter portion comes into contact with both the first wall and the second wall, so that the reaction force can be dispersedly received by these contact regions. In this manner, the reaction force can be dispersedly applied to the holding member to further suppress deformation of the holding member. In addition, it becomes possible to use an upper or lower rail having an inner width less than an outer diameter of the nut member (outer diameter of the large-diameter portion). Thus, for example, when the same nut member as that in the conventional structure is used, an upper rail and a lower rail each having a narrower width can be employed to facilitate downsizing of the rails.

In another aspect of the present invention, as in the second embodiment, the holding member has a plate-shaped first holding piece adapted to hold a front end of the nut member, a plate-shaped second holding piece disposed opposed to the first holding piece with a distance therebetween in the frontward-rearward direction and adapted to hold a rear end of the nut member, two plate-shaped first protruding pieces protruding from the first holding piece toward respective ones of the first and second sides in the widthwise direction, and two plate-shaped second protruding pieces protruding from the second holding piece toward respective ones of the first and second sides in the widthwise direction. In this case, the opening further includes a pair of holding-member insertion hole provided in the first wall on respective ones of opposite sides of the nut-receiving hole thereof in the frontward-rearward direction to allow respective ones of the first protruding piece protruding toward the first side and the second protruding piece protruding toward the first side to be inserted thereinto, and a pair of holding-member insertion hole provided in the second wall on respective ones of opposite sides of the nut-receiving hole thereof in the frontward-rearward direction to allow respective ones of the first protruding piece protruding toward the second side and the second protruding piece protruding toward the second side to be inserted thereinto.

In this seat slide structure, the reaction force from the nut member can be supported not only by the large-diameter portion but also by the first protruding pieces and the second protruding pieces.

It is understood that the present invention is not limited to the above embodiments, but various changes and modification may be made therein without departing from the spirits thereof. For example, although the seat slide structure according to each of the above embodiments is designed such that the screw rod 3 is assembled to the lower rail 1, and the holding member 5 is assembled to the upper rail 2, the present invention is not limited thereto. For example, the screw rod 3 may be assembled to the upper rail 2, and the holding member 5 may be assembled to the lower rail 1. In this seat slide structure where the holding member 5 is assembled to the lower rail 1, the nut-receiving hole 20 and/or the protruding-piece insertion holes 27, 28 may be provided in the lower rail 1.

Although the seat slide structure according to each of the above embodiments is designed such that the protruding-piece insertion holes 27, 28 are provided in respective ones of the right sidewall 22 and the left sidewall 23 of the upper rail 2, and the protruding pieces 58, 59 are provided in the front holding piece 51 and the rear holding piece 52, the present invention is not limited thereto. For example, the protruding-piece insertion hole may be provided in only one of the right sidewall and the left sidewall of the upper rail, and the protruding piece may be provided at a position corresponding to the protruding-piece insertion hole.

Figure 12:
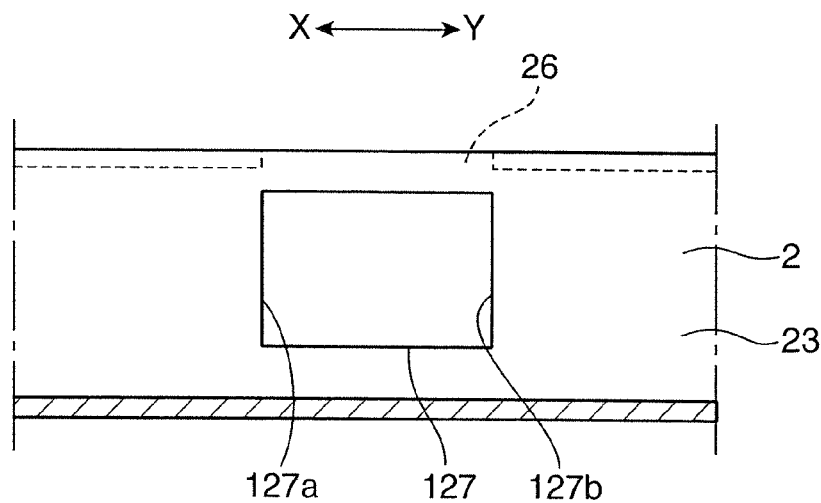
FIG. 12 is a fragmentary side view of an upper rail provided with a protruding-piece insertion hole, in a modification of the first embodiment.
Figure 13:
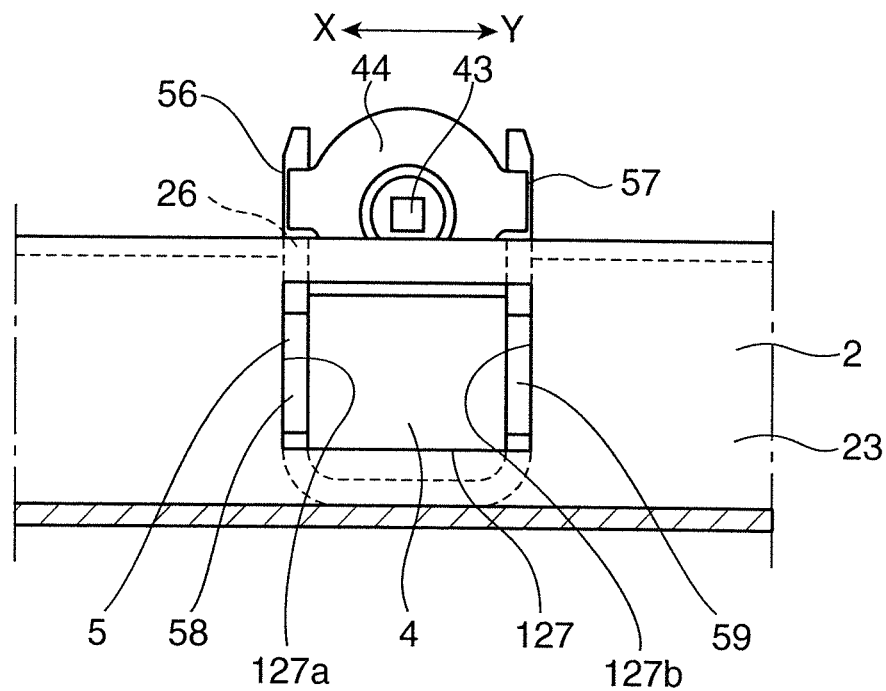
FIG. 13 is a fragmentary side view of the upper rail in a state after a protruding piece is inserted into the protruding-piece insertion hole, in the modification in FIG. 12.
Figure 14:
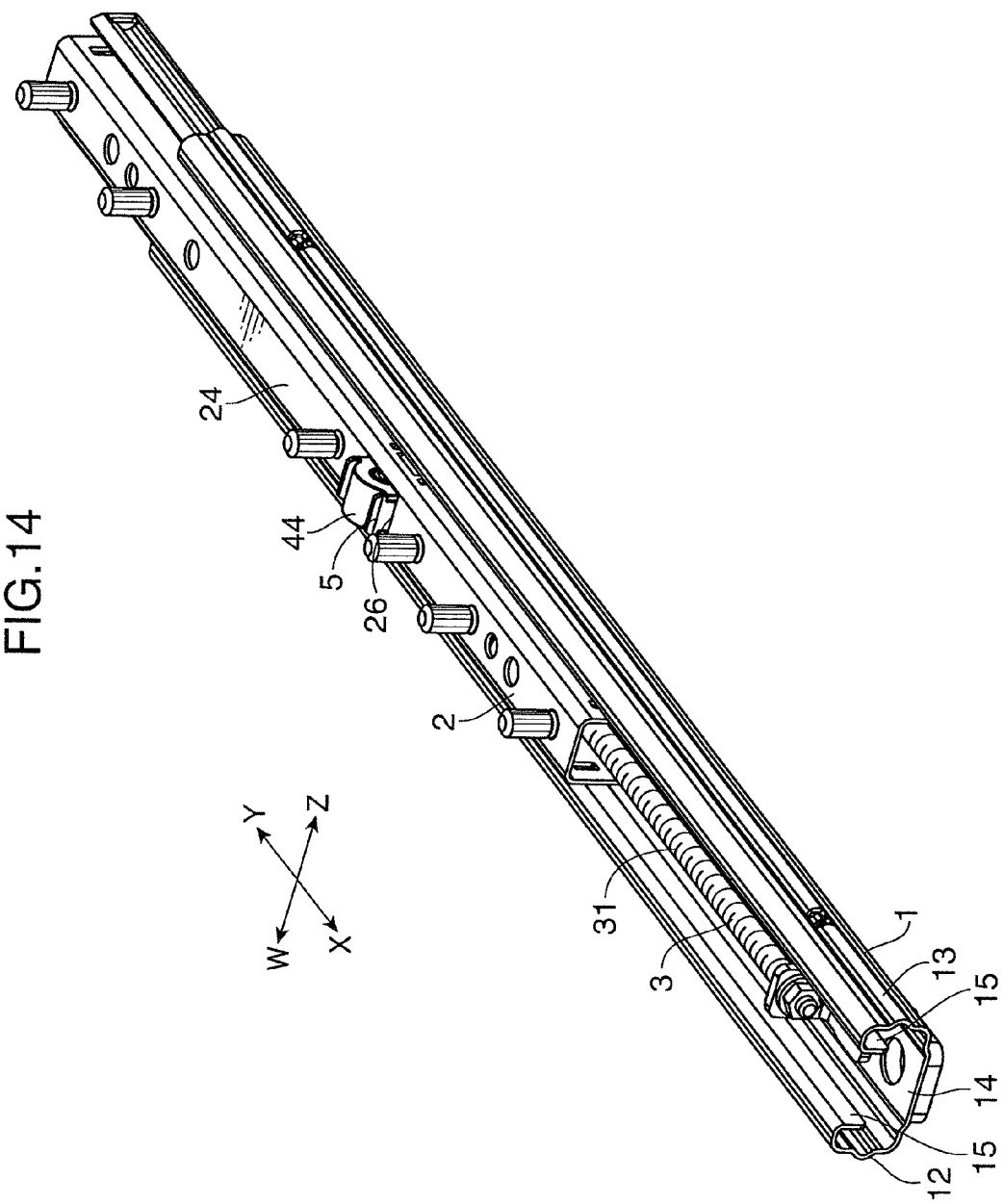
FIG. 14 is a perspective view showing an automobile seat slide structure according to a second embodiment of the present invention.

Although the seat slide structure according to each of the above embodiments is designed such that the slit-shaped protruding-piece insertion holes 27, 28 each having a space (opening size in the frontward-rearward direction) approximately equal to a plate thickness of each of the first protruding pieces 58 and the second protruding pieces 59 are provided in respective ones of the right sidewall 22 and the left sidewall 23, the present invention is not limited thereto. For example, as shown in FIG. 12, the seat slide structure may be designed such that a single protruding-piece insertion hole 127 is provided in each of the right sidewall 22 and the left sidewall 23 of the upper rail 2 (in FIG. 12, only the left sidewall 23 is illustrated). Each of the protruding-piece insertion holes 127 is an oblong-shaped hole having an opening size (in the frontward-rearward direction) approximately equal to the distance L4 between the front protruding-piece insertion hole 27 and the rear protruding-piece insertion hole 28 illustrated in FIG. 11. As shown in FIG. 13, the first protruding piece 58 and the second protruding piece 59 are simultaneously inserted into each of the protruding-piece insertion holes 127. In this seat slide structure, for example, when the reaction force is applied to the holding member 5 in the frontward direction, each of the first protruding pieces 58 is brought into contact with a front inner side-surface 127*a* of a respective one of the protruding-piece insertion holes 127. Otherwise, when the reaction force is applied to the holding member 5 in the rearward direction, each of the second protruding pieces 59 is brought into contact with a rear inner side-surface 127*b* of a respective one of the protruding-piece insertion holes 127. In this manner, the holding piece can be supported to suppress deformation of the holding member 5.

Although the seat slide structure according to each of the above embodiments is designed such that the locking hole 26 is provided in the upper wall 24 of the upper rail 2, and the first lockable portion 56 and the second lockable portion 57 are provided on respective ones of the distal ends of the first holding piece 51 and the second holding piece 52, the present invention is not limited thereto. For example, the protruding-piece insertion holes 27, 28 provided in the sidewall 22 and the left sidewall 23 may be used as the locking hole, and the first protruding pieces 58 and the second protruding pieces 59 of the holding member 5 may be formed to function as the lockable portion.

Although the seat slide structure according to the second embodiments is designed such that the nut-receiving hole 20 is provided in each of the right sidewall 22 and the left sidewall 23 of the upper rail 2, and the large-diameter portion 40 to be inserted into the nut-receiving hole 20 is provided in the nut member 4, the present invention is not limited thereto. For example, the seat slide structure may be designed as follows. The nut-receiving hole 20 is provided in only one of the right sidewall 22 and the left sidewall 23 of the upper rail 2. The nut member 4 is formed to have an outer diameter less than a distance between the respective inner surfaces of the right sidewall 22 and the left sidewall 23 of the upper rail 2. Further, each of the nut member 4 and the screw rod 3 is disposed on the side of one of the right sidewall 22 and the left sidewall 23 provided with the nut-receiving hole 20 to allow a part of the nut member 4 on one side in a radial direction to be inserted into the nut-receiving hole 20.

Although the seat slide structure according to the second embodiment is designed such that the first protruding pieces 58 and the second protruding pieces 59 are provided in the holding body 5, and the protruding-piece insertion holes 27, 28 are provided in the upper rail 2, these elements may be omitted. Specifically, in the second embodiment, as long as there are the nut-receiving hole and the part of the nut member to be inserted into the nut-receiving hole, the protruding pieces 58, 59 and the protruding-piece insertion holes 27, 28 may be omitted.

Further, in the second embodiment where the first protruding pieces 58 and the second protruding pieces 59 are provided in the holding body 5, and the protruding-piece insertion holes 27, 28 are provided in the upper rail 2, it is not essential to form each of the protruding-piece insertion holes 27, 28 into a slit-like shape. For example, a hole having a shape as shown in FIGS. 25 and 26 may be employed.

Figure 25:
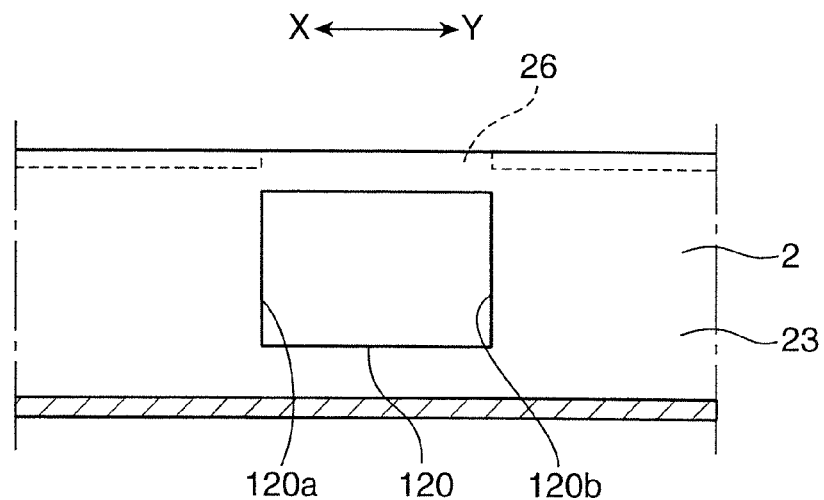
FIG. 25 is a fragmentary side view of an upper rail provided with a nut-receiving hole and a protruding-piece insertion hole, in a modification of the second embodiment.
Figure 26:
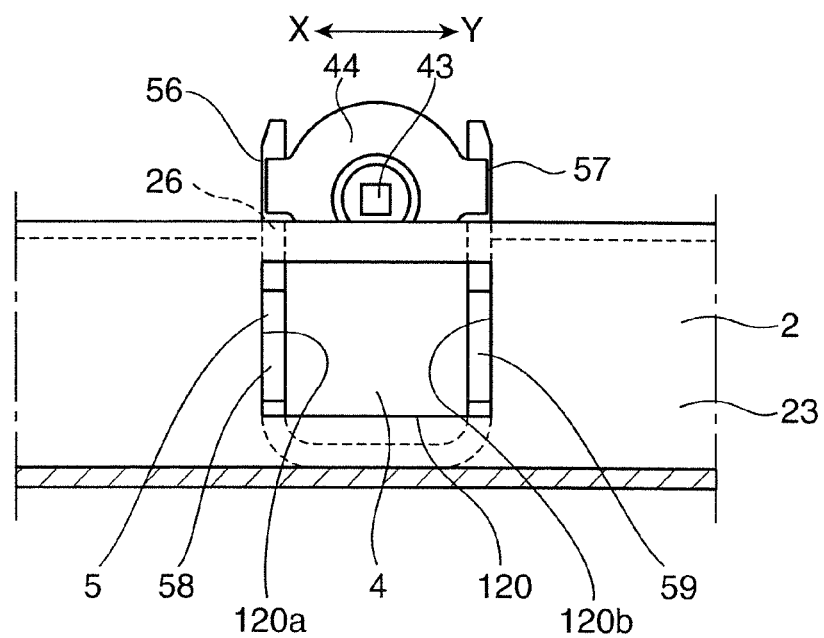
FIG. 26 is a fragmentary side view of the upper rail in a state after the nut member and a protruding piece is inserted into the nut-receiving hole and the protruding-piece insertion hole, in the modification in FIG. 25.

As shown in FIG. 25, a single quadrangular-shaped window hole 120 is formed in each of the left sidewall 23 and the right sidewall 22 of the upper rail 2 to have an opening size (in the frontward-rearward direction) capable of receiving therein the first protruding piece 58, the second protruding piece 59 and the nut member 4 (in FIG. 25, only the left sidewall 23 is illustrated). Then, as shown in FIG. 26, the first protruding piece 58, the second protruding piece 59 and the nut member 4 may be inserted into the window hole 120.

In this seat slide structure, for example, when a force is applied to the upper rail 2 in the frontward or rearward direction as described above, the first protruding piece 58 or the second protruding piece 59 is brought into contact with a front inner side-surface 120*a* or a rear inner side-surface 120*b* of the window hole 120, so that the front inner side-surface 120*a* or the rear inner side-surface 120*b* can receive a reaction force from the nut member 4 through the first protruding piece 58 or the second protruding piece 59. Thus, the front inner side-surface 120*a* or the rear inner side-surface 120*b* can support the holding member 5 applied with the reaction force from the nut member 4 to suppress deformation of the holding member 5.

This application is based on Japanese Patent Applications Serial No. 2009-231199, filed on Oct. 5, 2009, No. 2009-231200, filed on Oct. 5, 2009, No. 2009-231299, filed on Oct. 5, 2009, and No. 2009-231300, filed on Oct. 5, 2009, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A seat slide structure for a vehicle, comprising:
a first rail and a second rail, one of the first and second rails being fixed to a vehicle body to extend along a frontward-rearward direction of the vehicle body and the other of the first and second rails being fixed to a seat and adapted to be relatively movable in the frontward-rearward direction with respect to the vehicle body;
a screw rod provided in the first rail;
a nut member screwed with the screw rod in a relatively rotatable manner with respect to the screw rod; and
a holding member provided in the second rail to hold the nut member,
wherein:
the second rail has a first wall provided at a position on a first one of opposite sides in a widthwise direction thereof, and a second wall provided at a position on a second of the opposite sides in the widthwise direction and disposed opposed to the first wall, at least one of the first wall and the second wall having an opening;
the opening includes a nut-receiving hole adapted to allow a part of the nut member to be inserted therein; and
the nut member is disposed such that an axial direction thereof is oriented in the frontward-rearward direction to have a frontwardly-facing front surface and a rearwardly-facing rear surface,
and wherein the part of the nut member to be inserted into the nut-receiving hole includes a part of the front surface and a part of the rear surface, the part of the front surface being disposed opposed to a front inner side-surface of the nut-receiving hole, the part of the rear surface being disposed opposed to a rear inner side-surface of the nut-receiving hole.

2. The seat slide structure as defined in claim 1, wherein:
the part of the front surface is disposed opposed to the front inner side-surface of the nut-receiving hole through a minute gap; and
the part of the rear surface is disposed opposed to the rear inner side-surface of the nut-receiving hole through a minute gap.

3. The seat slide structure as defined in claim 1, wherein:
the nut-receiving hole is provided in each of the first wall and the second wall; and
the nut member has a large-diameter portion with an outer diameter greater than a distance in the widthwise direction between respective inner surfaces of the first wall and the second wall, the large-diameter portion including the front surface and the rear surface, a region of the large-diameter portion on the first side in the widthwise direction being inserted in the nut-receiving hole of the first wall, a region of the large-diameter portion on the second side in the widthwise direction being inserted in the nut-receiving hole of the second wall.

4. The seat slide structure as defined in claim 3, wherein:
the holding member has a plate-shaped first holding piece adapted to hold a front end of the nut member, a plate-shaped second holding piece disposed opposed to the first holding piece with a distance therebetween in the frontward-rearward direction and adapted to hold a rear end of the nut member, two plate-shaped first protruding pieces protruding from the first holding piece toward respective ones of the first and second sides in the widthwise direction, and two plate-shaped second protruding pieces protruding from the second holding piece toward respective ones of the first and second sides in the widthwise direction; and
the opening further includes a pair of holding-member insertion hole provided in the first wall on respective ones of opposite sides of the nut-receiving hole thereof in the frontward-rearward direction to allow respective ones of the first protruding piece protruding toward the first side and the second protruding piece protruding toward the first side to be inserted thereinto, and a pair of holding-member insertion hole provided in the second wall on respective ones of opposite sides of the nut-receiving hole thereof in the frontward-rearward direction to allow respective ones of the first protruding piece protruding toward the second side and the second protruding piece protruding toward the second side to be inserted thereinto.

5. The seat slide structure as defined in claim 4, wherein:
the second rail further includes a third wall connecting between respective base ends of the first wall and the second wall, the third wall having a locking hole adapted to lock the holding member; and
the holding member further includes a connection piece connecting between respective base ends of the first holding piece and the second holding piece, the holding member being adapted to be elastically deformable in the frontward-rearward direction, the holding member further having a first lockable portion located at a distal end of the first holding piece and a second lockable portion located at a distal end of the second holding piece, the first lockable portion and the second lockable portion being adapted, under a condition that a force against an elastic force of the holding member is applied thereto to narrow a distance therebetween in the frontward-rearward direction, to become insertable into the locking hole, and, under a condition that the force against the elastic force is released after the insertion into the locking hole, to be locked in the locking hole while pressing respective inner side-surfaces of the locking hole facing in the frontward-rearward direction.

6. A seat slide structure, comprising:
a first rail and a second rail, one of the first and second rails being fixed to a vehicle body to extend along a frontward-rearward direction of the vehicle body and the other of the first and second rails being fixed to a seat and adapted to be relatively movable in the frontward-rearward direction with respect to the vehicle body;
a screw rod provided in the first rail;
a nut member screwed with the screw rod in a relatively rotatable manner with respect to the screw rod; and
a holding member provided in the second rail to hold the nut member, wherein:

the second rail has a first wall provided at a position on a first one of opposite sides in a widthwise direction thereof, and a second wall provided at a position on a second of the opposite sides in the widthwise direction and disposed opposed to the first wall, at least one of the first wall and the second wall having an opening;

at least one of a part of the holding member and a part of the nut member is inserted in the opening and disposed opposed to an inner side-surface of the opening facing in the frontward-rearward direction;

the second rail has a locking hole adapted to lock the holding member; and the holding member has a first lockable portion and a second lockable portion disposed opposed to each other with a distance therebetween in an axial direction of the screw rod, the holding member being elastically deformable in the axial direction of the screw rod, the first lockable portion and the second lockable portion being adapted, under a condition that a force against an elastic force of the holding member is applied thereto to narrow a distance therebetween in the axial direction of the screw rod, to become insertable into the locking hole, and, under a condition that the force against the elastic force is released after the insertion into the locking hole, to be locked in the locking hole while pressing respective inner side-surfaces of the locking hole facing in the axial direction of the screw rod.

7. The seat slide structure as defined in claim 6, wherein;

the second rail further has a third wall connecting between respective base ends of the first wall and the second wall, the locking hole is provided in the third wall, the holding member further includes a pair of plate-shaped first and second holding pieces disposed opposed to each other with a distance therebetween in the axial direction of the screw rod, and a connection piece connecting between respective base ends of the first holding piece and the second holding piece, and the first lockable portion is located at a distal end of the first holding piece, and the second lockable portion is located at a distal end of the second holding piece.

8. The seat slide structure as defined in claim 6, wherein:

the holding member is a plate shaped body obtained by forming a single sheet of metal plate having elasticity into a generally U-shape through bending work such that the first holding piece, the second holding piece, the connection piece, the first lockable portion and the second lockable portion are integral with each other.

9. The seat slide structure as defined in claim 6, wherein:

when no external force is applied to the holding member, a distance between respective outer surfaces of the first lockable portion and the second lockable portion is greater than an opening size of the locking hole in the axial direction of the screw rod.

10. The seat slide structure as defined in claim 6, wherein:

when no external force is applied to the holding member, a distance between the first holding piece and the second holding piece gradually increases in a direction from the base ends to the distal end thereof.

* * * * *